US012159582B2

(12) United States Patent
Sano

(10) Patent No.: US 12,159,582 B2
(45) Date of Patent: Dec. 3, 2024

(54) PIXEL CIRCUIT, DISPLAY DEVICE, AND METHOD FOR DRIVING SAME

(71) Applicant: SHARP KABUSHIKI KAISHA, Sakai (JP)

(72) Inventor: Masahito Sano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/271,930

(22) PCT Filed: Jan. 19, 2021

(86) PCT No.: PCT/JP2021/001628

§ 371 (c)(1),
(2) Date: Jul. 12, 2023

(87) PCT Pub. No.: WO2022/157822

PCT Pub. Date: Jul. 28, 2022

(65) Prior Publication Data

US 2024/0304144 A1 Sep. 12, 2024

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01);
(Continued)

(58) Field of Classification Search
CPC .. G09G 3/3233; G09G 3/3266; G09G 3/3291; G09G 2300/043; G09G 2320/0247; G09G 2330/021
See application file for complete search history.

(56) References Cited

U.S. PATENT DOCUMENTS

2017/0124941 A1* 5/2017 Na ........................ G09G 3/2092
2019/0057646 A1 2/2019 Lin et al.
(Continued)

FOREIGN PATENT DOCUMENTS

JP 2019-211775 A 12/2019
JP 2020-112795 A 7/2020

*Primary Examiner* — Amit Chatly
(74) *Attorney, Agent, or Firm* — ScienBiziP, P.C.

(57) ABSTRACT

The present application discloses a display device, such as an organic EL display device, which is of a current-driven type and is capable of displaying a satisfactory image free from perceivable flickering across all areas of the image even when pause drive is performed. Each pixel circuit is provided with a bias supply circuit 151, which includes a bias retention capacitor Cbs and a bias control transistor T8 connected in series with each other. In a pause drive mode, emission control lines and bias control lines are driven during both drive and pause periods. The bias control transistor is controlled through the bias control line such that in the drive period, a voltage of a data signal line Dj is written to a data retention capacitor Cst and simultaneously to the bias retention capacitor Cbs, whereas in the pause period, the voltage written in the bias retention capacitor Cbs is applied to a source terminal of a drive transistor during an on-bias application period within a non-emission period.

20 Claims, 19 Drawing Sheets

(52) U.S. Cl.
CPC ................. *G09G 2300/043* (2013.01); *G09G 2320/0247* (2013.01); *G09G 2330/021* (2013.01)

(56) References Cited

U.S. PATENT DOCUMENTS

| | | | | |
|---|---|---|---|---|
| 2019/0371237 | A1 | 12/2019 | Qian et al. | |
| 2020/0118487 | A1 | 4/2020 | Kim et al. | |
| 2020/0226978 | A1* | 7/2020 | Lin | H01L 29/7869 |
| 2021/0027696 | A1* | 1/2021 | Kim | G09G 3/3233 |
| 2021/0287605 | A1* | 9/2021 | Wang | G09G 3/2092 |
| 2021/0350740 | A1* | 11/2021 | Byun | G09G 3/32 |
| 2021/0366397 | A1* | 11/2021 | Na | H10K 59/1213 |
| 2022/0059016 | A1* | 2/2022 | Baek | G09G 3/3233 |
| 2022/0208932 | A1* | 6/2022 | Yun | H10K 59/1216 |

* cited by examiner

PIXEL CIRCUIT, DISPLAY DEVICE, AND METHOD FOR DRIVING SAME

TECHNICAL FIELD

The present disclosure relates to current-driven display devices provided with display elements, such as organic EL (electro-luminescent) elements, which are driven by currents, particularly to pixel circuits to be used in such display devices.

BACKGROUND ART

In recent years, organic EL display devices provided with pixel circuits which include organic EL elements (also referred to as organic light-emitting diodes (OLEDs)) have been put into practical use. In addition to the organic EL element, the pixel circuit in such an organic EL display device includes a drive transistor, a write control transistor, a retention, capacitor, etc. As the drive transistor and the write control transistor, thin-film transistors are used, and the drive transistor is connected at a gate terminal, which serves as a control terminal, to the retention capacitor, to which a driver circuit supplies a data voltage through a data signal line. The data voltage is a voltage corresponding to a video signal that represents an image to be displayed (more specifically, the voltage specifies a gradation value for a pixel to be formed by the pixel circuit). The organic EL element is a self-luminous display element which emits light with a luminance corresponding to a current flowing therethrough. The drive transistor is provided in series with the organic EL element and configured to control the current flowing through the organic EL element in accordance with a voltage retained in the retention capacitor.

On the other hand, there are known low-power display devices in which pause drive is performed. Pause drive, also called "intermittent drive" or "low-frequency drive", is a drive method using a drive period (refresh period) and a pause period (no-refresh period) to continuously display the same image, and the drive period and the pause period are set such that the driver circuit operates during the drive period but stops operating during the pause period. Pause drive can be applied when transistors serving as switching elements in the pixel circuit have low off-state leak-age currents. A known example of a transistor with a low off-state leakage current is a thin-film transistor whose channel layer is formed of an oxide semiconductor (referred to below as an "oxide TFT"), and a typical example of such a thin-film transistor is an oxide TFT using an indium gallium zinc oxide (InGaZnO) semiconductor as an oxide semiconductor (such an oxide TFT will be referred to below as an "IGZO-TFT"). Accordingly, there have been proposed some organic EL display devices in which the pixel circuits have thin-film transistors whose channel layers are formed of high-mobility, low-temperature polycrystalline silicon (referred to below as "LTPS-TFTs"), as well as GZO-TFTs with low off-state leakage currents, the LTPS-TFTs being used as the drive transistors, the IGZO-TFTs being used as switching elements, and in which pause drive is performed on a display portion including such pixel circuits (see, for example, the specification of U.S. Patent Application Publication No. 2020/0118487).

CITATION LIST

Patent Documents

Patent Document 1: Specification of U.S. Patent Application Publication No. 2019/0057646
Patent Document 2: Specification of U.S. Patent Application Publication No. 2020/0118487
Patent Document 3: Japanese Laid-Open Patent Publication No. 2020-112795

SUMMARY

Technical Problem

In the case where the organic EL display device performs pause drive, in the drive period, the organic EL element in each pixel circuit is set in a light-off state by an emission control transistor during a non-emission period that is set for each frame period, but in the pause period, the driver circuit stops operating so that the organic EL element in each pixel circuit continues to emit light with a luminance corresponding to a data voltage written in the preceding drive period. In general, the pause period is considerably longer than the drive period (for example, the drive period consists of one to several frame periods, and the pause period consists of several tens of frame periods), and when the organic EL display device is operating in a pause drive mode, the drive and pause periods as described above alternate with each other. Accordingly, in the case where pause drive is performed as above, turning off the organic EL elements in the drive period results in perceivable flickering.

Or the other hand, the specification of U.S. Patent Application Publication No. 2019/0057646 describes a pixel circuit and a method for driving the same in which, to eliminate flickering which is perceived during pause drive (low-frequency drive), the pixel circuit is configured such that luminance dips are caused by turning off an organic EL element (light-emitting diode 304) during a drive period (data refresh period T_refresh) and also by turning off the organic EL element at a suitable frequency during a pause period (extended blanking period T blank) (see FIGS. 8A, 8B, 9A, and 9B).

However, even when the pixel circuit is configured such that luminance dips are also caused by turning off the pixel circuit at a suitable frequency during the pause period (such a configuration will be referred to below as a "periodically-turned-off configuration"), the pixel circuit includes a thin-film transistor as a drive transistor, and because of hysteresis characteristics of the thin-film transistor, flickering is still perceivable during the low-frequency drive (pause drive). More specifically, in the case of the periodically-turned-off configuration, the thin-film transistor serving as the drive transistor is subjected to different voltage stresses between the drive and pause periods, resulting in slightly different light-off waveforms between the drive and pause periods due to the hysteresis characteristics of the drive transistor and thus perceivable flickering.

To inhibit the occurrence of such flickering due to the hysteresis characteristics of the drive transistor, it has been proposed to intentionally apply a bias stress voltage (referred to below as an "on-bias voltage" or simply as a "bias voltage") to the drive transistor during the pause period (see, for example, the specification of U.S. Patent Application Publication No. 2020/0118487 and Japanese Laid-Open Patent Publication No. 2020-112795). However, the present inventor has confirmed that even such intentional application of the bias voltage during the pause period does not necessarily inhibit flickering across all areas of a display image, with the result that flickering is still perceivable.

Therefore, it is desired that a display device, such as an organic EL display device, which is of a current-driven type, is capable of displaying a satisfactory image free from flickering across all areas of the image even when pause drive is performed.

Solution to Problem

Several embodiments of the disclosure provide a pixel circuit provided in a display device with a display portion including a plurality of data signal lines, a plurality of first scanning signal lines, a plurality of emission control lines, and first and second power supply lines, the pixel circuit corresponding to one of the data signal lines, one of the first scanning signal lines, and one of the emission control lines, the pixel circuit including:

- a current-driven display element;
- a drive transistor having a control terminal, a first conductive terminal, and a second conductive terminal, and connected in series with the display element;
- a data retention capacitor;
- a data write control switching element having a control terminal connected to a corresponding one of the first scanning signal lines, and configured to control writing of a voltage of a corresponding one of the data signal lines to the data retention capacitor;
- a first emission control switching element having a control terminal connected to a corresponding one of the emission control lines; and
- a bias supply circuit, wherein,
- the display portion further includes a plurality of bias control lines,
- the pixel circuit corresponds to one of the bias control lines,
- the bias supply circuit includes:
  - a bias retention capacitor configured to retain a voltage that corresponds to the voltage of the corresponding one of the data signal lines; and
  - a bias control switching element connected in series with the bias retention capacitor and having a control terminal connected to a corresponding one of the bias control lines,
- the control terminal of the drive transistor is connected to a constant voltage line through the data retention capacitor, and
- the first conductive terminal of the drive transistor is connected to the first power supply line through the first emission control switching element and to the constant voltage line through the bias control switching element and the bias retention capacitor.

Several embodiments of disclosure provide a display device including:

- a display portion including a plurality of data signal lines, a plurality of first scanning signal lines, a plurality of emission control lines, a plurality of bias control lines, a first power supply line, a second power supply line, and a plurality of pixel circuits;
- a data-side drive circuit configured to generate and apply a plurality of data signals to the data signal lines;
- a scanning-side drive circuit configured to selectively drive the first scanning signal lines, selectively drive the emission control lines, and selectively drive the bias control lines; and a display control circuit configured to control the data-side drive circuit and the scanning-side drive circuit such that a drive period and a pause period alternate with each other, with the drive period including a refresh frame period for writing voltages of the data signals to the pixel circuits as data voltages, and the pause period including a non-refresh frame period for stopping the writing of the data voltages to the pixel circuits, wherein, each of the pixel circuits corresponds to one of the data signal lines, one of the first scanning signal lines, one of the emission control lines, and one of the bias control lines, each of the pixel circuits includes:

- a current-driven display element;
- a drive transistor having a control terminal, a first conductive terminal, and a second conductive terminal, and connected in series with the display element;
- a data retention capacitor;
- a data write control switching element having a control terminal connected to a corresponding one of the first scanning signal lines, and configured to control writing of a voltage of a corresponding one of the data signal lines to the data retention capacitor;
- a first emission control switching element having a control terminal connected to a corresponding one of the emission control lines; and
- a bias supply circuit, in each of the pixel circuits, the bias supply circuit includes a bias retention capacitor configured to retain a voltage that corresponds to the voltage of the corresponding one of the data signal lines, and a bias control switching element connected in series with the bias retention capacitor and having a control terminal connected to a corresponding one of the bias control lines, in each of the pixel circuits, the control terminal of the drive transistor is connected to a constant voltage line through the data retention capacitor, in each of the pixel circuits, the first conductive terminal of the drive transistor is connected to the first power supply line through the first emission control switching element and to the constant voltage line through the bias control switching element and the bias retention capacitor, the display control circuit controls the data-side drive circuit and the scanning-side drive circuit such that in the drive period, when the first emission control switching element is in OFF state, the voltage of the corresponding one of the data signal lines is written and retained in the data retention capacitor as the data voltage, and a voltage that corresponds to the data voltage is written and retained in the bias retention capacitor, whereas when the first emission control switching element is in ON state, a current that corresponds to the retained voltage of the data retention capacitor flows to the display element, and the display control circuit controls the scanning-side drive circuit such that in the pause period, when the first emission control switching element is in OFF state, the retained voltage of the bias retention capacitor is applied to the first conductive terminal of the drive transistor, whereas when the first emission control switching element is in ON state, the current that corresponds to the retained voltage of the data retention capacitor flows to the display element.

Several embodiments of the disclosure provide a drive method for driving a display device with a display portion including a plurality of data signal lines, a plurality of first scanning signal lines, a plurality of emission control lines, first and second power supply lines, and a plurality of pixel circuits, wherein, the display portion further includes a plurality of bias control lines, each of the pixel circuits corresponds to one of the data signal lines, one of the first scanning signal lines, one of the emission control lines, and one of the bias control lines, each of the pixel circuits includes:

a current-driven display element;

a drive transistor having a control terminal, a first conductive terminal, and a second conductive terminal, and connected in series with the display element;

a data retention capacitor;

a data write control switching element having a control terminal connected to a corresponding one of the first scanning signal lines, and configured to control writing of a voltage of a corresponding one of the data signal lines to the data retention capacitor;

a first emission control switching element having a control terminal connected to a corresponding one of the emission control lines; and a bias supply circuit, in each of the pixel circuits, the bias supply circuit includes a bias retention capacitor configured to retain a voltage that corresponds to the voltage of the corresponding one of the data signal lines, and a bias control switching element connected in series with the bias retention capacitor and having a control terminal connected to a corresponding one of the bias control lines, in each of the pixel circuits, the control terminal of the drive transistor is connected to a constant voltage line through the data retention capacitor, in each of the pixel circuits, the first conductive terminal of the drive transistor is connected to the first power supply line through the first emission control switching element and to the constant voltage line through the bias control switching element and the bias retention capacitor, the method comprises a pause drive step of driving the data signal lines and the first scanning signal lines such that a drive period and a pause period alternate with each other, with the drive period including a refresh frame period for writing voltages of data signals to the pixel circuits as data voltages, and the pause period including a non-refresh frame period for stopping the writing of the data voltages to the pixel circuits, and the pause drive step includes:

a drive period step of applying the data signals to the data signal lines, selectively driving the first scanning signal lines and the bias control lines, and selectively deactivating the emission control lines, such that in the drive period, when the first emission control switching element is in OFF state, the voltage of the corresponding one of the data signal lines is written and retained in the data retention capacitor as the data voltage, and a voltage that corresponds to the data voltage is written and retained in the bias retention capacitor, whereas when the first emission control switching element is in ON state, a current that corresponds to the retained voltage of the data retention capacitor flows to the display element, and a pause period step of stopping the driving of the first scanning signal lines, selectively driving the bias control lines, and selectively deactivating the emission control lines, such that in the pause period, when the first emission control switching element is in OFF state, the retained voltage of the bias retention capacitor is applied to the first conductive terminal of the drive transistor, whereas when the first emission control switching element is in ON state, the current that corresponds to the retained voltage of the data retention capacitor flows to the display element.

Effect of the Disclosure

In the above embodiments of the disclosure, the pixel circuit used in the display device includes the bias supply circuit, which has the bias retention capacitor and the bias control switching element, as well as the current-driven display element, the drive transistor, the data write control switching element, the first emission control switching element, and the data retention capacitor. When the display device performs pause drive in which the drive period, which includes the refresh frame period, and the pause period, which includes the non-refresh frame period, alternate with each other, the emission control lines and the bias control lines are driven during both the drive and pause periods. As a result of such driving of the emission control lines and the bias control lines, in the drive period, the voltage that corresponds to the voltage of the data signal line is written and retained in the bias retention capacitor of each pixel circuit when the voltage of the data signal line is written to the data retention capacitor, and in the pause period, the retained voltage of the bias retention capacitor is applied to the first conductive terminal of the drive transistor within the non-emission period. More specifically, in the non-emission period within the pause period, the first conductive terminal of the drive transistor is supplied with a bias stress voltage corresponding to a display gradation of the pixel circuit. This eliminates or reduces the difference between the drive period and the pause period in terms of the voltage stress that is applied to the drive transistor of each pixel circuit in the non-emission period, resulting in less perceivable flickering. Thus, even when pause drive is performed with a view to achieving low power consumption, it is possible to display a satisfactory image free from perceivable flickering across all areas of the image.

DESCRIPTION OF EMBODIMENTS

Hereinafter, embodiments will be described with reference to the accompanying drawings. Note that for each transistor referred to below, a gate terminal corresponds to a control terminal, either a drain or source terminal corresponds to a first conductive terminal, and the other corresponds to a second conductive terminal. Moreover, in each embodiment below, the transistor is, for example, a thin-film transistor, but this does not limit the disclosure. In addition, unless otherwise specified, the term "connection" herein refers to "electrical connection", the meaning of which encompasses not only direct connection but also indirect connection through another or other elements, without departing from the gist of the disclosure.

1. FIRST EMBODIMENT

<1.1 Overall Configuration>

Figure 1:
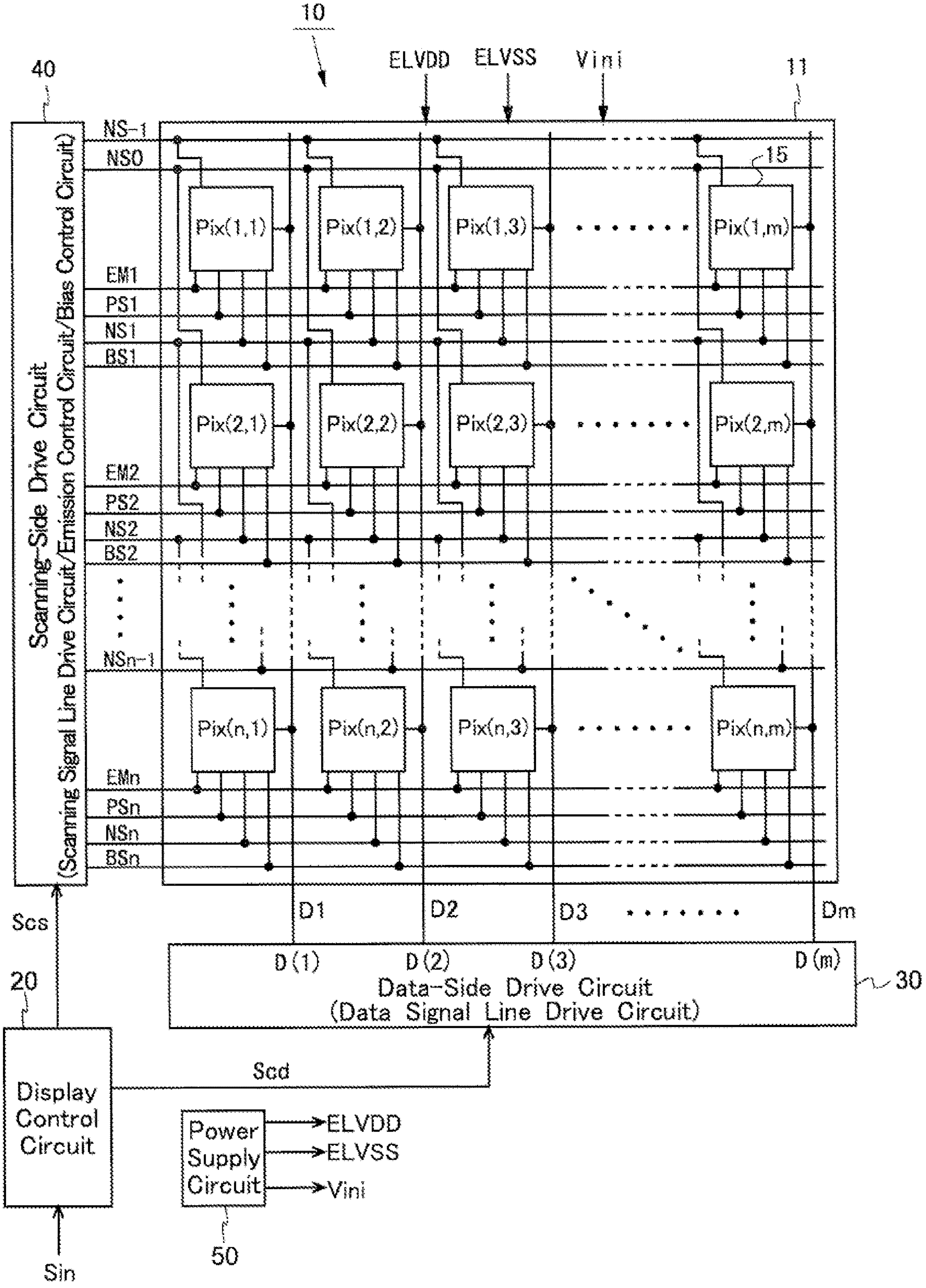
FIG. 1 is a block diagram illustrating the overall configuration of a display device according to a first embodiment.

FIG. 1 is a block diagram illustrating the overall configuration of a display device 10 according to a first embodiment. The display device 10 is an organic EL display device that performs internal compensation. More specifically, in the display device 10, each pixel circuit 15 has a function of compensating for variations and shifts in threshold voltage among internal drive transistors. Moreover, the display device 10 has two modes of operation: normal drive mode and pause drive mode. More specifically, in the normal drive mode, the display device 10 operates such that refresh frame periods Trf for rewriting image data (data voltages within the pixel circuits) in a display portion occur consecutively. In the pause drive mode, a drive period TD, which consists of only a refresh frame period Trf, alternates with a pause period TP, which consists of a plurality of non-refresh frame periods Tnrf for stopping the rewriting of the image data in the display portion (see FIG. 12 to be described below).

As shown in FIG. 1, the display device 10 includes a display portion 11, a display control circuit 20, a data-side drive circuit 30, a scanning-side drive circuit 40, and a power supply circuit 50. The data-side drive circuit 30 functions as a data signal line driver circuit (also referred to as a "data driver"). The scanning-side drive circuit 40 functions as a scanning signal line driver circuit (also referred to as a "gate driver"), an emission control circuit (also referred to as an "emission driver"), and a bias control circuit. In the configuration shown in FIG. 1, these three circuits on the scanning side are implemented by one scanning-side drive circuit 40, but in other configurations, these three circuits may be suitably separated or may be disposed separately on different sides of the display portion 11. Moreover, the data-side drive circuit and the scanning-side drive circuit, at least in part, may be integrally formed with the display portion 11. These can also be applied to other embodiments and variants to be described later. The power supply circuit 50 generates a high-level power supply voltage ELVDD, a low-level power supply voltage ELVSS, and an initialization voltage Vini, all of which are to be supplied to the display portion 11, as will be described later. The power supply circuit 50 also generates a power supply voltage (not shown), which is to be supplied to the display control circuit. 20, the data-side drive circuit 30, and the scanning-side drive circuit 40.

The display portion 11 has provided therein m (where m is an integer of 2 or more) data signal lines D1, 2, . . . , Dm, n first scanning signal lines PS1, PS2, . . . , PSn, and n+2 (where n is an integer of 2 or more) second scanning signal lines NS−1, NS0, NS1, . . . , NSn, and the first and second scanning signal lines cross the data signal lines. Moreover, there are n emission control lines (emission lines) EM1 to EMn respectively provided along the n first scanning signal lines PS1 to PSn. There are also n bias control lines BS1 to BSn respectively provided along the n first scanning signal lines PS1 to PSn. Further, the display portion 11 is provided with m×n pixel circuits 15 arranged in a matrix along the m data signal lines D1 to Dm and the n first scanning signal lines PS1 to PSn. Each pixel circuit 15 corresponds to one of the m data signal lines D1 to Dm and one of the n first scanning signal lines PS1 to PSn (to distinguish the pixel circuits 15, the pixel circuit that corresponds to the i'th first scanning signal line PS1 and the j'th data signal line Dj will also be referred to below as the "i'th-row, j'th-column pixel circuit" and denoted by the symbol "Pix(i,j)"). Moreover, each pixel circuit 15 also corresponds to one of the n second scanning signal lines NS1 to NSn and one of the n emission control lines EM1 to EMn. Further, each pixel circuit 15 also corresponds to one of the n bias control lines BS1 to BSn.

Furthermore, the display portion 11 is provided with unillustrated power supply lines shared by the pixel circuits 15. More specifically, there are first and second power supply lines. The first power supply line is a constant voltage line for supplying the high-level power supply voltage ELVDD to drive organic EL elements to be described later (the first power supply line will be referred to below as the "high-level power supply line" and denoted by the same symbol "ELVDD" as the high-level power supply voltage). The second power supply line is a constant voltage line for supplying the low-level power supply voltage ELVSS to drive the organic EL elements (the second power supply line will be referred to below as the "low-level power supply line" and denoted by the same symbol "ELVSS" as the low-level power supply voltage). Further, the display portion 11 includes an unillustrated initialization voltage line (to be denoted by the same symbol "Vini" as the initialization voltage) as a constant voltage line for supplying the initialization voltage Vini to be used for a reset operation for initializing the pixel circuits 15 (also referred to as an "initialization operation"). The high-level power supply voltage ELVDD, the low-level power supply voltage ELVSS, and the initialization voltage Vini are supplied by the power supply circuit 50.

The display control circuit 20 receives an input signal Sin, which includes image information representing an image to be displayed and timing control information for image display, from outside the display device 10, generates a data control signal Scd and a scanning control signal Scs based on the input signal Sin, and outputs the data control signal Scd and the scanning control signal Scs to the data-side drive circuit 30 and the scanning-side drive circuit 40, respectively.

In accordance with the data control signal Scd from the display control circuit 20, the data-side drive circuit 30 drives the data signal lines D1 to Dm. More specifically, in accordance with the data control signal Scd, the data-side drive circuit 30 generates m data signals D(1) to D(m) representing an image to be displayed, and applies the data signals D(1) to D(m) to the data signal lines D1 to Dm, respectively.

In accordance with the scanning control signal Scs from the display control circuit 20, the scanning-side drive circuit 40 functions as the scanning signal line driver circuit to drive the n first scanning signal lines PS1 to PSn and the n+2 second scanning signal lines NS−1 to NSn, the emission control circuit to drive the emission control lines EM1 to EMn, and the bias control circuit to drive the bias control lines BS1 to BSn.

Figure 7:
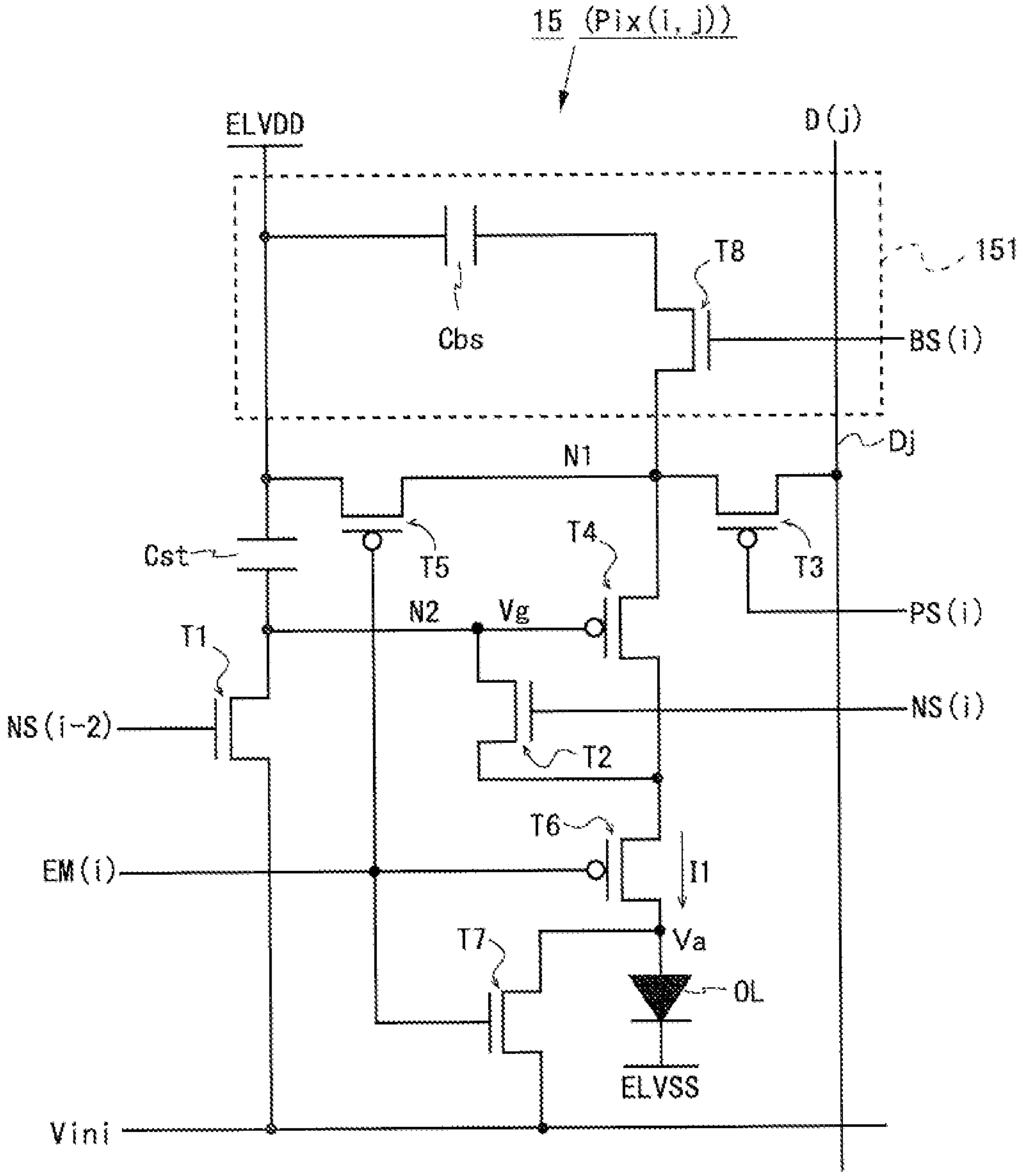
FIG. 7 is a circuit diagram illustrating the configuration of a pixel circuit in the first embodiment.

More specifically, in accordance with the scanning control signal Scs, the scanning-side drive circuit 40 functions as the scanning signal line driver circuit during the refresh frame period Trf to sequentially select each of the n first scanning signal lines PS1 to PSn for a predetermined period of time that corresponds to one horizontal period and also each of the n+2 second scanning signal lines NS−1 to NSn for the predetermined period of time that corresponds to one horizontal period, and apply an active signal to the first scanning signal line PSk being selected (where k is an integer such that 1≤k≤5 n), an active signal to the second scanning signal line NSs being selected (where s is an integer such that −1≤s≤n), and inactive signals to the first and second scanning signal lines not being selected. As a result, m pixel circuits Pix(k,1) to Pix(k,m) corresponding to the first scanning signal line PSk being selected are selected collectively. Thus, during the period when the first scanning signal line PSk is being selected (referred to below as the "k'th scanning selection period"), voltages of the m data signals D((1) to D(m) applied to the data signal lines D1 to Dm by the data-side drive circuit 30 (these voltages will also be referred to simply as "data voltages" without distinction) are respectively written to the pixel circuits Pix(k,1) to Pix(k,m) as pixel data. Note that in the present embodiment, the first scanning signal line PSi1 (where i1=1 to n) is connected to gate terminals of P-channel (also referred to below as "P-type") transistors in the pixel circuits 15, and the second scanning signal line NSi2 (where i2=−1 to n) is connected to gate terminals of N-channel (also referred to below as "N-type") transistors in the pixel circuits 15, as shown in FIG. 7 to be described below. Accordingly, the active signal applied to the first scanning signal line PSi1 being selected is a low-level voltage, and the active signal applied to the second scanning signal line NSi2 being selected is a high-level voltage.

Furthermore, during the refresh frame period Trf, the scanning-side drive circuit 40 drives the emission control lines EM1 to EMn such that the emission control lines EM1 to EMn are selectively deactivated in conjunction with the driving of the first and second scanning signal lines PS1 to PSn and NS−1 to NSn. More specifically, the scanning-side drive circuit 40 functions as the emission control circuit in accordance with the scanning control signal Scs to apply an emission control signal that specifies non-emission (a high-level voltage) to the i'th emission control line EMi (where i=1 to n) during a predetermined period of time including the i'th horizontal period and an emission control signal that specifies emission (a low-level voltage) during other periods. While the voltage of the emission control line EMi is at a low level (active), the organic EL elements in the pixel circuits Pix(i,1) to Pix(i,m) corresponding to the i'th first scanning signal line PSi (referred to below as the "i'th-row pixel circuits") emit light with respective luminances that correspond to the data voltages written in the i'th-row pixel circuits Pix(i,1) to Pix(i,m). Note that during the non-refresh frame period Tnrf, the scanning-side drive circuit 40 drives the emission control lines EM1 to EMn in the same manner as during the refresh frame period Trf (see FIG. 12 to be described later).

Furthermore, the scanning-side drive circuit 40 functions as the bias control circuit in the pause drive mode to drive the bias control lines BS1 to BSn such that the bias control lines BS1 to BSn are sequentially selected during both the refresh frame period Trf and the non-refresh frame period Tnrf (see FIG. 12 to be described later). This operation will be described in detail later. Note that in the normal drive mode, the driving of the bias control lines BS1 to BSn is stopped, with the result that the bias control lines BS1 to BSn are all kept in an unselected state.

<1.2 General Operation>

As described earlier, the display device 10 according to the present embodiment has two modes of operation: normal drive mode and pause drive mode. The general operation of the display device 10 in the normal drive mode will be described first.

Figure 2:
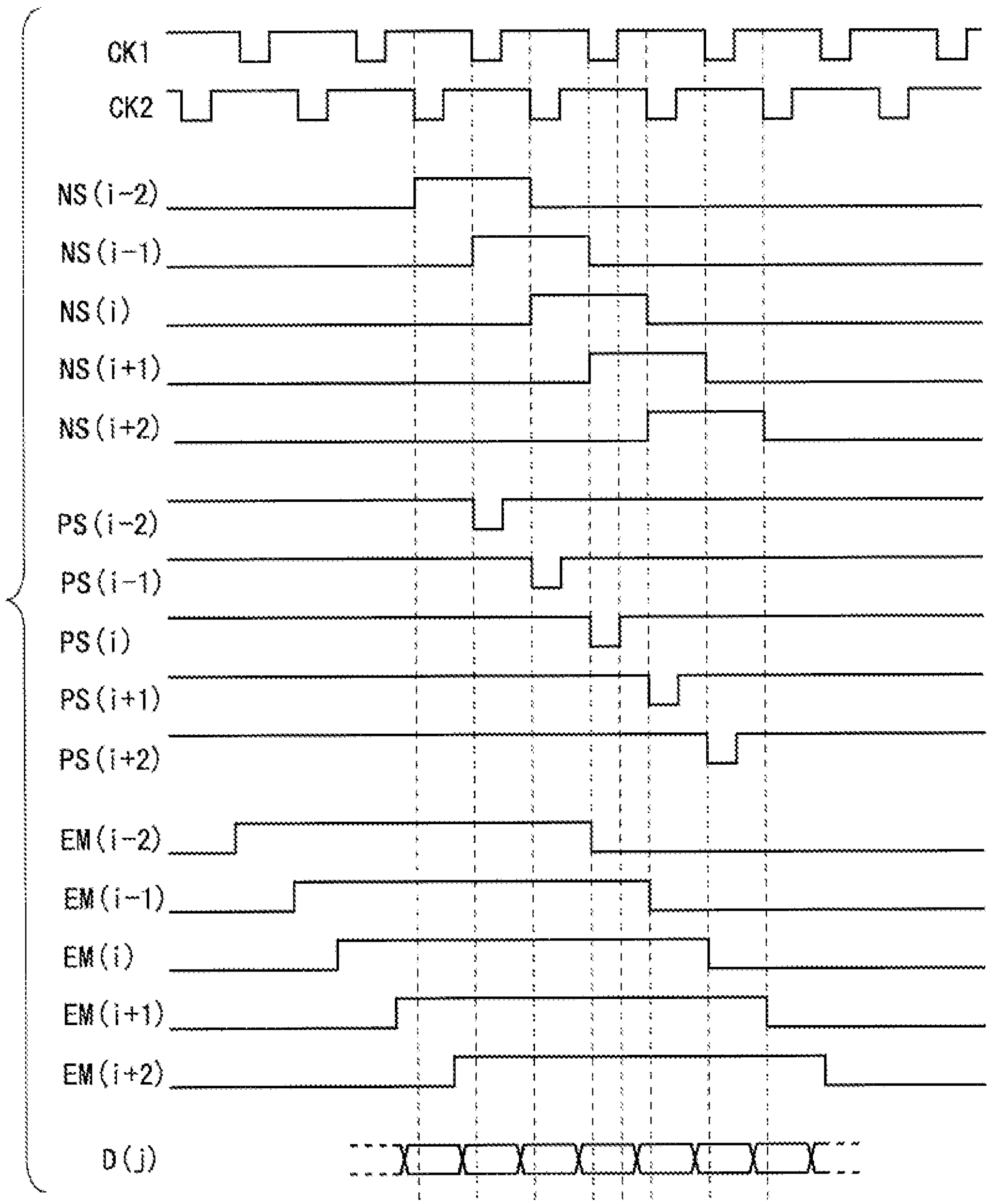
FIG. 2 is a timing chart for describing the general operation of the display device according to the first embodiment in a normal drive node.

FIG. 2 is a timing chart for describing the general operation of the display device 10 in the normal drive mode. The scanning control signal Scs provided to the scanning-side drive circuit 40 by the display control circuit 20 includes a two-phase clock signal consisting of first and second gate clock signals CK1 and CK2. In the normal drive mode, the scanning-side drive circuit 40 generates first scanning signals PS(1) to PS(n) and second scanning signals NS(−1), NS(0), NS(1), . . . , NS(n) as shown in FIG. 2 in accordance with the two-phase clock signal, and applies the first scanning signals PS(1) to PS(n) to the first scanning signal lines PS1 to PSn, respectively, and the second scanning signals NS(−1) to NS (n) to the second scanning signal lines NS−1 to NSn, respectively. Moreover, in accordance with the two-phase clock signal (i.e., the first and second gate clock signals CK1 and CK2), the scanning-side drive circuit 40 generates emission control signals EM(1) to EM(n) as shown in FIG. 2, and applies the emission control signals EM(1) to EM(n) to the emission control lines EM1 to EMn, respectively. On the other hand, the data-side drive circuit 30 generates data signals D(M) to D(m), which change in relation to the first scanning signals PS(1) to PS (n), as shown in FIG. 2, in accordance with the data control signal Scd from the display control circuit 20, and applies the data signals D(1) to D(m) to the data signal lines D1 to Dm, respectively. In this manner, the first scanning signal lines PS1 to PSn, the second scanning signal lines NS−1 to NSn, the emission control lines EM1 to EMn, and the data signal lines D1 to Dm in the display portion 11 are driven so that the initialization voltage and the data voltages are written to the pixel circuits Pix(i,j) during the non-emission period, and the pixel circuits Pix(i,j) emit light with luminances corresponding to the written data voltages during the emission period.

In the normal drive mode, the first scanning signal lines PS1 to PSn, the second scanning signal lines NS−1 to NSn, the emission control lines EM1 to EMn, and the data signal lines D1 to Dm are driven as described above, in accordance with the signals shown in FIG. 2, with the result that the refresh frame period Trf, during, which the first scanning signal lines PS1 to PSn and the second scanning signal line NS−1 to NSn are sequentially selected to write image data to (the pixel circuits Pix (1,1) to Pix (n,m) of) the display portion 11 within one frame period, is repeated multiple times. Note that in the normal drive mode, the driving of the bias control lines BS1 to BSn is stopped, with the result that the bias control lines BS1 to BSn are kept in an unselected state (at a low-level voltage), as described earlier.

Figure 12:
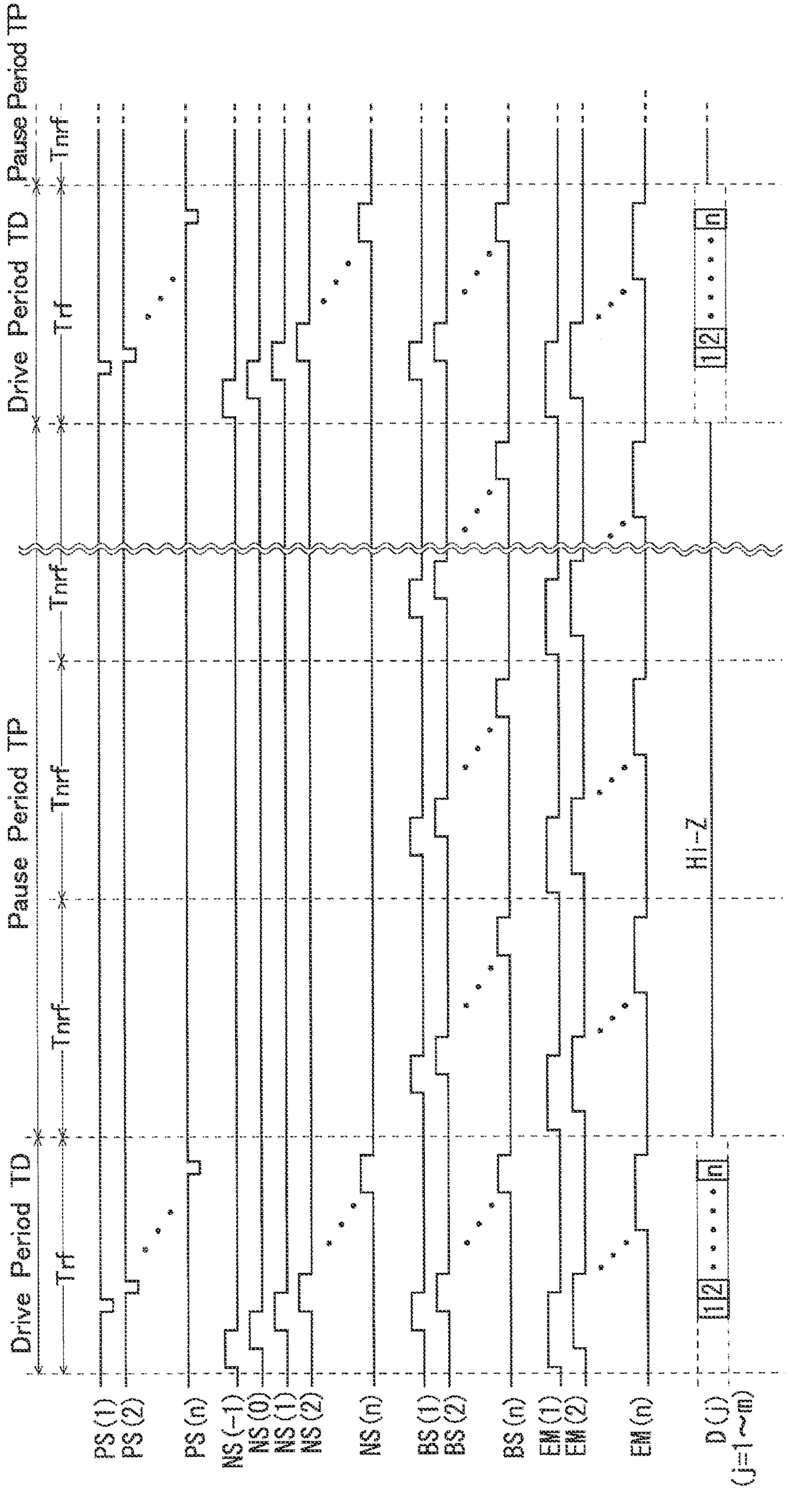
FIG. 12 is a timing chart for describing a method for driving the display device according to the first embodiment.

On the other hand, in the pause drive mode, the drive period TD, which consists of only such a refresh frame period (also referred to below as the "RF frame period") Trf as above, alternates with the pause period TP, which consists of a plurality of non-refresh frame periods (also referred to below as "NRF frame" periods) Tnrf, as shown in FIG. 12 to be described later. During the pause period TP (i.e., the NRF frame periods Tnrf), the driving of the first scanning signal lines PS1 to PSn and the second scanning signal lines NS−1 to NSn by the scanning-side drive circuit 40 and the driving of the data signal lines D1 to Dm by the data-side drive circuit 30 are stopped, with the result that image data written during the drive period TD (i.e., the RF frame period Trf) immediately preceding the pause period TP continues to be displayed. Accordingly, the pause drive mode is advantageous in reducing power consumption of the display device where a still image is displayed. In the pause drive mode, the bias control lines B1 to BSn are driven so as to be sequentially selected during both the RF frame period Trf and the NRF frame period Tnrf, as shown in FIG. 12. As a result, during the NRF frame period Tnrf, an on-bias voltage is applied to each pixel circuit 15 in accordance with a data voltage written to the pixel circuit 15 during the immediately preceding RF frame period Trf (details will, be described later). Note that the drive period TD consists of only one RF frame period Trf in the example in FIG. 12, but may consist of two or more RF frame periods Trf.

The input signal Sin provided from outside includes an operation mode signal Sm specifying the operation mode, either the normal or pause drive mode described above, in which to drive the display portion 11. The operation mode signal Sm is provided to the scanning-side drive circuit 40 as part of the scanning control signal Scs and to the data-side drive circuit 30 as part of the data control signal. Scd. The scanning-side drive circuit 40 drives the first scanning signal lines PS1 to PSn and the second scanning signal lines NS−1 to NSn in accordance with the operation mode specified by the operation mode signal Sm, and drives the emission control lines EM1 to EMn in the same manner (i.e., at the same cycle and duty ratio), regardless of whether the normal drive mode or the pause drive mode. Moreover, the scanning-side drive circuit 40 drives the bias control lines BS1 to BSn in the pause drive mode, and stops driving the bias control lines BS1 to BSn in the normal drive mode. The data-side drive circuit 30 drives the data signal lines D1 to Dn in accordance with the operation mode specified by the operation mode signal Sm. Note that the normal drive mode is irrelevant to the problem addressed in the present application, and therefore the following description of the operation of the display device 10 or the pixel circuit thereof mainly focuses on the operation in the pause drive mode (the same applies to other embodiments to be described later).

In the present embodiment, during the drive period TD (i.e., the RF frame period Trf), the operation of writing data to each pixel circuit Pix(i,j) is performed when the first and second scanning signal line Psi, NSi corresponding to the pixel circuit Pix(i,j) are being selected, and the operation of initializing the pixel circuit Pix(i,j) is performed when the second scanning signal line NSi−2, which is two lines prior to the second scanning signal line NSi, is being selected. The emission control line EMi (where i=1 to n) is driven such that each pixel circuit Pix(i,j) is set in a light-off state during the period in which the data writing operation is performed and the period in which the initialization operation is performed (see FIG. 8 to be described later). As will be described later, in the present embodiment, the pixel circuit Pix (i,j) uses P-channel transistors as first and second emission control transistors T5 and T6, and therefore each emission control line EMi is activated when the emission control line EMi is provided with a low-level (L-level) voltage, and deactivated when a high-level (H-level) voltage is provided.

<1.3 Configuration and Operation of the Pixel Circuit>

In the following, the configuration and operation of a pixel circuit in a display device in a comparative example to the present embodiment (also referred to below as a "pixel circuit in the comparative example") will be described first, and then the configuration and operation of the pixel circuit 15 in the present embodiment will be described in comparison with the configuration and operation of the pixel circuit in the comparative example. Note that in the comparative example, the display device has a display portion without the bias control lines BS1 to BSn, and therefore the scanning-side drive circuit 40 does not function as a bias control circuit. However, the configuration of the display device in the comparative example is the same as that of the display device according to the present embodiment except for the components that are related to the bias control lines BS1 to BSn, and therefore the same or corresponding parts of the display device in the comparative example as those in the present embodiment are denoted by the same reference characters and will not be elaborated upon.

<1.3.1 Configuration and Operation of the Pixel Circuit in the Comparative Example>

As described earlier, in order to inhibit flickering due to hysteresis characteristics of the drive transistor in the pixel circuit of the organic EL display device that performs pause drive, it has been proposed to apply an on-bias voltage and thereby intentionally create a voltage stress on the drive transistor during the pause period. In a conceivable configuration based on this proposal, for example, the non-emission period is set at a suitable frequency within the pause period such that the data-side drive circuit applies the on-bias voltage to each pixel circuit through the data signal line during the non-emission period. Accordingly, a pixel circuit compatible with such a configuration will be described below as a pixel circuit in the comparative example. Note that as described earlier, the present inventor has confirmed that, even when such a configuration is employed, flickering is not necessarily inhibited across all areas of a display image and is still perceivable. Therefore, the configuration and operation of the pixel circuit in the comparative example will be described below, making reference to the mechanism of such a defect.

Figure 3:
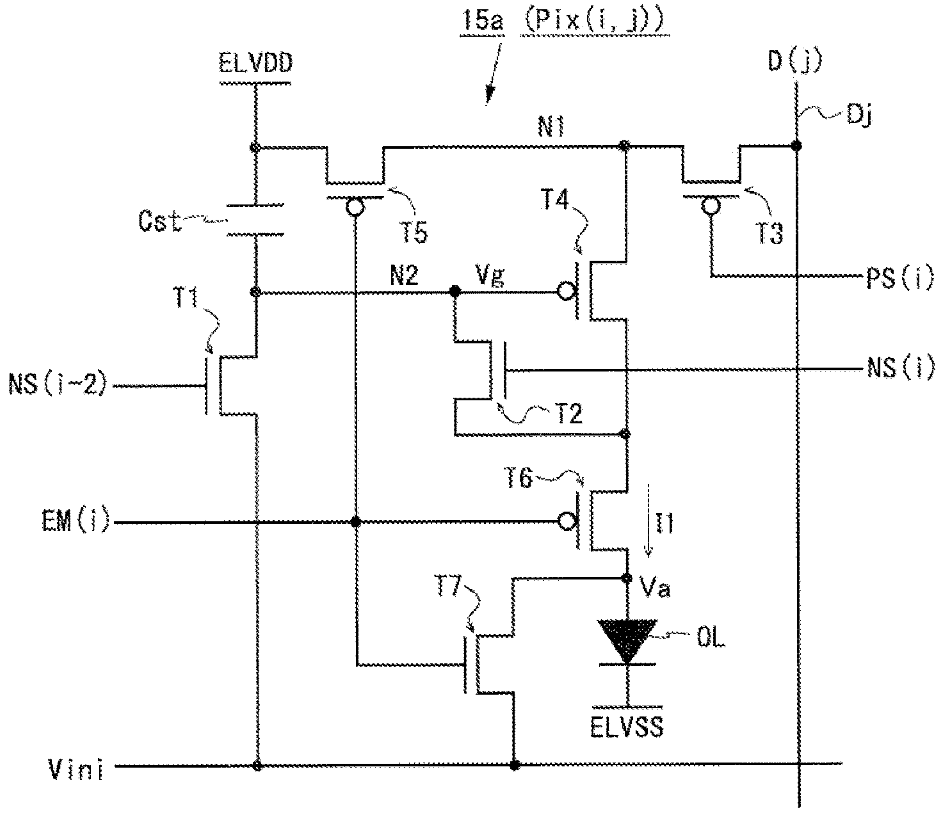
FIG. 3 is a circuit diagram illustrating the configuration of a pixel circuit in a comparative example to the first embodiment.

FIG. 3 is a circuit diagram illustrating the configuration of the pixel circuit 15*a* in the comparative example; more specifically, the circuit diagram depicts the configuration of the pixel circuit 15*a* that corresponds to the i'th first scanning signal line PSi and the j'th data signal line Dj (where 1≤i≤n, and 1≤j≤m), i.e., the i'th-row, j'th-column pixel circuit Pix(i,j). The pixel circuit 15*a* includes an organic EL element OL serving as a display element, seven transistors T1 to T7 (referred to below as a "first initialization transistor T1", a "threshold compensation transistor T2", a "data write control transistor T3", a "drive transistor T4", a "first emission control transistor T5", a "second emission control transistor T6", and a "second initialization transistor T7"), and a data retention capacitor Cst. The transistors T1, T2, and T7 are N-type transistors (more specifically, N-type IGZO-TFTs). The transistors T3 to T6 are P-type transistors (more specifically, P-type LTPS-TFTs). The data retention capacitor Cst is a capacitive element with two electrodes: first and second electrodes. Note that in the pixel circuit 15, the transistors T1 to T3 and T5 to T7, i.e., all the transistors excluding the drive transistor T4, function as switching elements.

The pixel circuit Pix(i,j) is connected to the first scanning signal line PSi that corresponds to the pixel circuit Pix(i,j) (also referred to below as the "corresponding first scanning signal line" in the description focusing on the pixel circuit), the second scanning signal line NSi that corresponds to the pixel circuit. Pix(i,j) (also referred to below as the "corresponding second scanning signal line" in the description focusing on the pixel circuit), the second scanning signal line that is two lines prior to the corresponding second scanning signal line NSi (the scanning signal line preceding by two lines in the order of scanning the second scanning signal lines NS−1 to Nsn), i.e., the i−2'th second scanning signal line NSi−2 (also referred to below as the "preceding second scanning signal line" in the description focusing on the pixel circuit), the emission control line EM1 that corresponds to the pixel circuit Pix(i,j) (also referred to below as the "corresponding emission control line" in the description focusing on the pixel circuit), the data signal line Dj that corresponds to the pixel circuit Pix(i,j) (also referred to below as the "corresponding data signal line" in the description focusing on the pixel circuit), the initialization voltage line Vini, the high-level power supply line ELVDD, and the low-level power supply line ELVSS.

As shown in FIG. 3, in the pixel circuit Pix(i,j) in the comparative example, the drive transistor T4 is connected at a gate terminal, which serves as a control terminal, to the high-level power supply line ELVDD through the data retention capacitor Cst and to the initialization voltage line Vini through the first initialization transistor T1. The drive transistor T4 is connected at a source terminal, which serves as a first conductive terminal, to the high-level, power supply line ELVDD through the first emission control transistor T5 and to the corresponding data signal line Dj through the data write control transistor T3. The drive transistor T4 is connected at a drain terminal, which serves as a second conductive terminal, to an anode electrode, which serves as a first terminal, of the organic EL element OL through the second emission control transistor T6 and to the gate terminal of the drive transistor T4 through the threshold compensation transistor T2. The organic EL element OL is connected at the anode electrode to the initialization voltage line Vini through the second initialization transistor T7 and at a cathode electrode, which serves as a second terminal, to the low-level power supply line ELVSS. The data write control transistor T3 is connected at a gate terminal to the first scanning signal line PSi. The threshold compensation transistor T2 is connected at a gate terminal to the second scanning signal line NSi. The first initialization transistor TI is connected at a gate terminal to the preceding second scanning signal line NSi−2. The first emission control transistor T5, the second emission control transistor T6, and the second initialization transistor T7 are all connected at respective gate terminals to the corresponding emission control line EMi.

Figure 4:
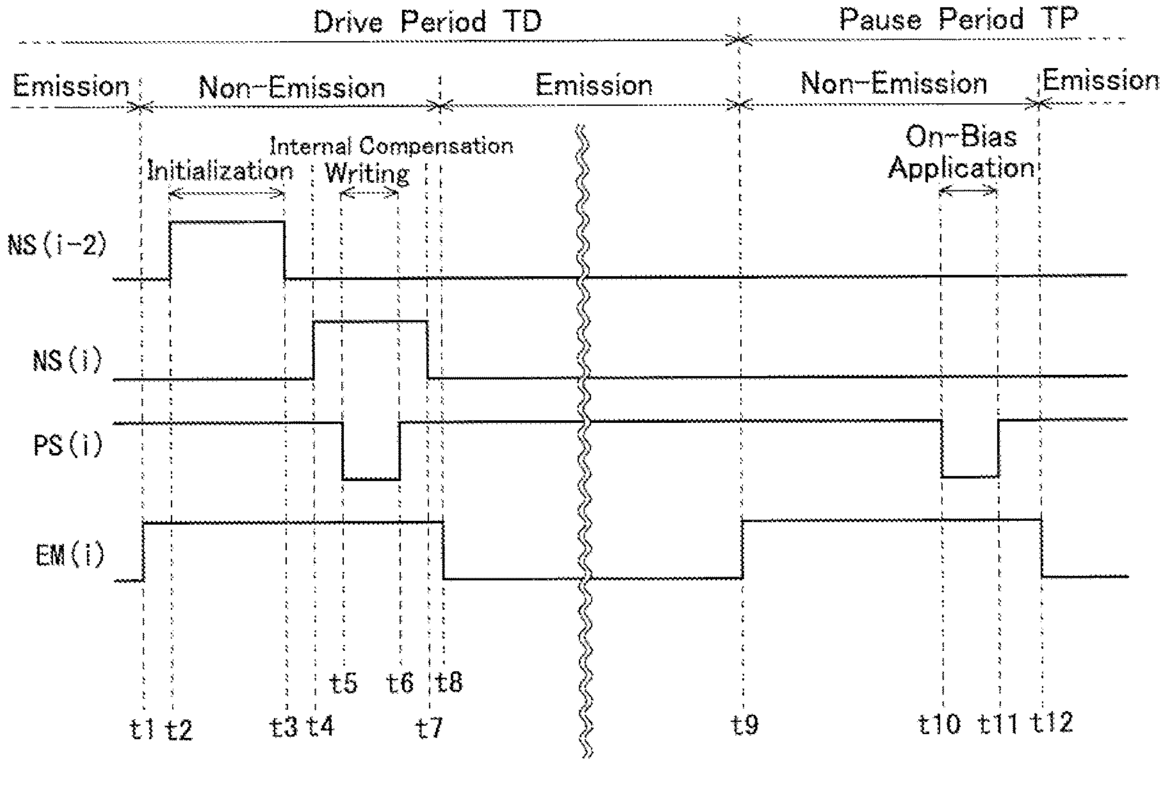
FIG. 4 is a timing chart for describing the operation of the pixel circuit in the comparative example.

Next, the operation of the pixel circuit 15*a* shown in FIG. 3, i.e., the i'th-row, j'th-column pixel circuit Pix(i,j) in the comparative example, will be described with reference to FIG. 4 together with FIG. 3. FIG. 4 is a timing chart for describing the operation of the pixel circuit Pix(i,j) during the non-emission period, which is included in each frame period. In this timing chart, times t1 to t8 fall within an RF frame period Trf included in a drive period TD, the drive period TD transitions to a pause period TP at time t9, and times t10 to t12 fall within the initial NRF frame period Tnrf during the pause period TP.

The pixel circuit Pix(i,j) in FIG. 3 is provided with an emission control signal (referred to below as a "corresponding emission control signal") EM(i) through the corresponding emission control line EMi, and when the corresponding emission control signal EM(i) changes from L level to H level at time t1, the first and second emission control transistors T5 and T6, which are of a P-type, switch from ON state to OFF state, and maintain OFF state while the emission control signal EM(i) is at H level. Accordingly, during the period from t1 to t8, the emission control signal EM(i) is at H level, and no current flows to the organic EL element OL, with the result that the pixel circuit Pix(i,j) is set in a light-off state. Note that during the period from t1 to t8, the second initialization transistor T7, which is of an N-type, is set in ON state, thereby initializing a voltage Va at the anode electrode (referred to below as an "anode voltage") of the organic EL element OL. Such initialization of the anode voltage Va blocks the influence of past display history and thereby preventing a deterioration in display quality. Moreover, during the pause period TP, the emission control signal EM(i) provided to the gate terminal of the second initialization transistor T7 is driven in a similar manner to during the drive period TD (see FIG. 4). Accordingly, the initialization of the anode voltage Va by the second initialization transistor T7 acts in the direction of better inhibiting flickering during pause drive with the same duration of the light-off period during both the drive period TD and the pause period TP.

In the period during which the pixel circuit Pix(i,j) is in the light-off state, i.e., the non-emission period from t1 to t8, a second scanning signal (also referred to below as a "preceding second scanning signal") NS(i−2), which is provided to the pixel circuit Pix(i,j) through the preceding second scanning signal line NSi−2, changes from L level to H level at time t2. As a result, the first initialization transistor T1, which is of an N-type, switches from OFF state to ON state, and maintains ON state while the second scanning signal NS(i−2) is at H level. In the period from t2 to t3, during which the first initialization transistor T1 is in ON state (referred to below as the "initialization period"), the data retention capacitor Cst is initialized, with the result that a voltage at a node N2, which includes the gate terminal of the drive transistor T4 and the first electrode of the data retention capacitor Cst, is set to the initialization voltage Vini. That is, the voltage at the gate terminal (referred to below as the "gate voltage") Vg of the drive transistor T4 is set to the initialization voltage Vini.

Figure 5:
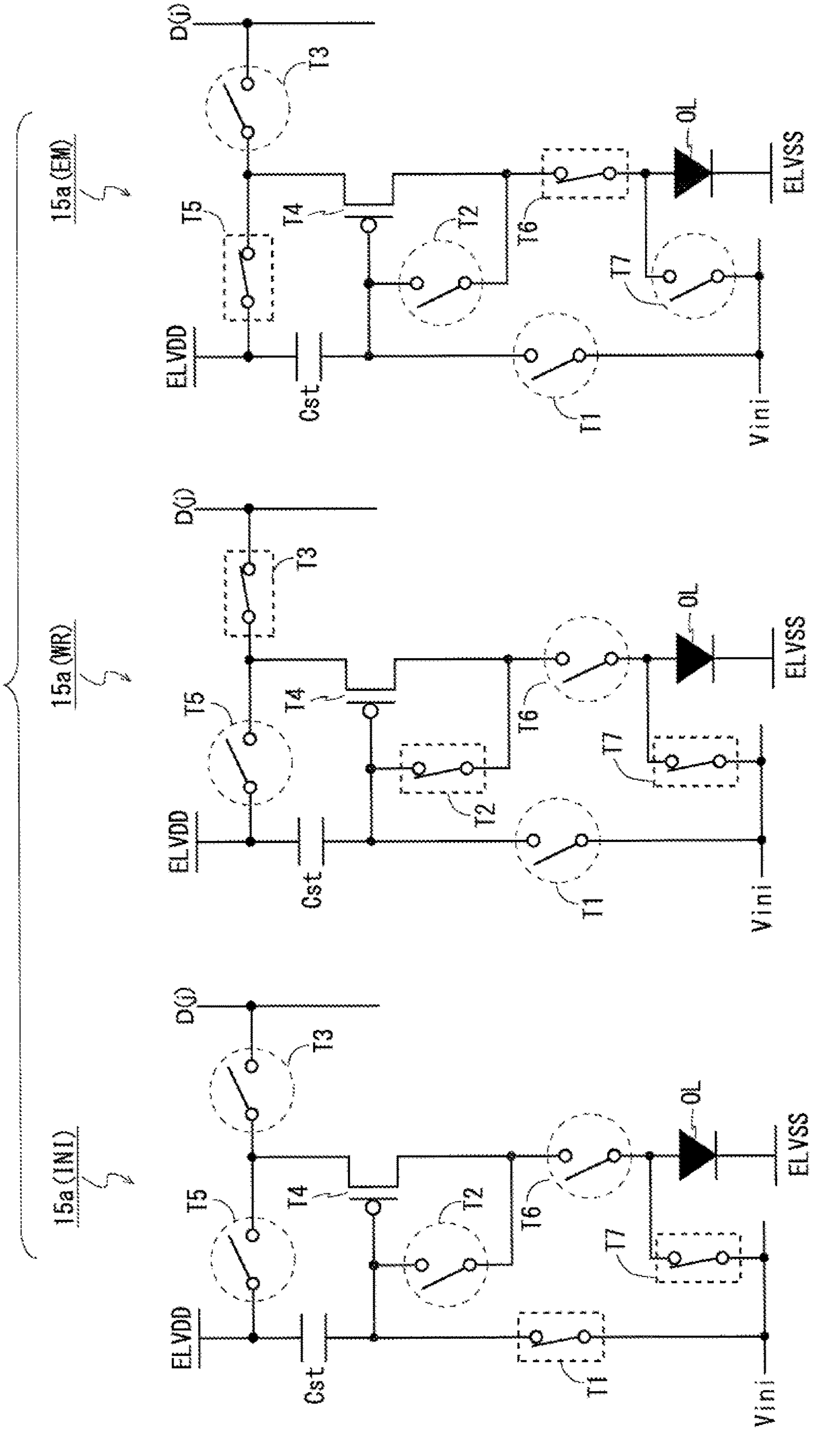
FIG. 5 includes circuit diagrams for describing respective ones of an initialization operation, a data write operation, and a light-on operation of the pixel circuit in the comparative example.

FIG. 5 includes a pixel circuit 15*a*(INI) schematically representing the state of the pixel circuit Pix(i,j) at that time, i.e., the state of the circuit at the time of the initialization operation. In the pixel circuit 15*a*(INI) in FIG. 5, dotted circles indicate that transistors in those circles, which serve as switching elements, are in OFF state, and dotted rectangles indicate that transistors in those rectangles, which serve as switching elements, are in ON state. This representation is also used for pixel circuits 15*a* (WR) and 15*a* (EM) in FIG. 5 and further used in FIGS. 6, 9, 10, 17, and 18 to be described later.

In the non-emission period from t1 to t8 for the pixel circuit Pix(i,j) in FIG. 3, the preceding second scanning signal NS(i−2) changes to L level at time t3, and a second scanning signal (also referred to below as a "corresponding second scanning signal") NS (i), which is provided to the pixel circuit Pix (i,j) through the corresponding second scanning signal line NSi, charges from L level to H level at time t4. As a result, the threshold compensation transistor T2, which is of an N-type, transitions from OFF state to ON state, and while the corresponding second scanning signal NS(i) is at H level, the threshold compensation transistor T2 maintains ON state, causing the drive transistor T4 to be short-circuited between its gate and drain terminals, i.e., to be diode-connected.

In the period from t4 to t7, during which the threshold compensation transistor T2 is in ON state, a first scanning signal (also referred to below as a "corresponding first scanning signal") PS(i), which is provided to the pixel circuit Pix(i,j) through the corresponding first scanning signal line PSi, changes from H level to L level at time t5. As a result, the data write control transistor T3, which is of a P-type, transitions from OFF state to ON state, and maintains ON state while the corresponding first scanning signal PS(i) is at L level. In the period from t5 to t6 (referred to below as the "data write period"), during which the data write control transistor T3 is in ON state, a voltage of a data signal D(j), which is provided to the pixel circuit Pix(i,j) through the corresponding data signal line Dj, is provided to the data retention capacitor Cst through the diode-connected drive transistor T4 as a data voltage Vdata. As a result, the data voltage subjected to threshold compensation is written and retained in the data retention capacitor Cst, and the gate voltage Vg of the drive transistor T4 is maintained at the voltage at the first electrode of the data retention capacitor Cst (also referred to below as the "retained voltage of the data retention capacitor Cst"). At this time, the gate voltage Vg takes a value given by the following equation, where the drive transistor T4 has a threshold voltage Vth (<0):

$$Vg = Vdata + Vth \tag{1}$$

In this manner, during the data write period from t5 to t6, data voltage writing is performed along with internal compensation. In FIG. 5, the pixel circuit 15*a*(WR) schematically represents the state of the pixel circuit Pix(i,j) at that time, i.e., the state of the circuit at the time of the data write operation.

After the data write period from t5 to t6, the corresponding second scanning signal NS(i) changes from H level to L level at time t7, with the result that the threshold compensation transistor T2 transitions to OFF state. Thereafter, the corresponding emission control signal. EM(i) changes from H level to L level at time t8, with the result that the first and second emission control transistors T5 and T6 transition to ON state, thereby starting an emission period. During the emission period, a current I1, the amount of which corresponds to the voltage retained in the data retention capacitor Cst, i.e., the drive transistor T4's gate-source voltage |Vgs| (absolute value), flows from the high-level power supply line ELVDD to the low-level power supply line ELVSS by way of the first emission control transistor T5, the drive transistor T4, the second emission control transistor T6, and the organic EL element OL. As a result, the organic EL element OL emits light with a luminance corresponding to the current II. In FIG. 5, the pixel circuit 15*a*(EM) schematically represents the state of the pixel circuit Pix(i,j) at that time, i.e., the state of the circuit at the time of the light-on operation.

The emission period continues until time t9, at which the corresponding emission control signal EM(i) changes from L level to H level. Once the corresponding emission control signal EM(i) changes to H level at time t9, the first and second emission control transistors T5 and T6 transition from ON state to OFF state, and maintain OFF state while the emission control signal EM(i) is at H level. Accordingly, in the period from t9 to t12, during which the emission control signal EM(i) is at H level, no current flows to the organic EL element OL, with the result that the pixel circuit Pix(i,j) is set in a light-off state.

As described earlier, the drive period TD transitions to the pause period TP at time t9. In the present comparative example, during the pause period TP, the driving of the second scanning signal lines NS−1 to NSn is stopped, with the result that the second scanning signals NS(−1) to NS(n) are maintained at L level, but the first scanning signal lines PS1 to PSn and the emission control lines EM1 to EMn continue to be driven (see FIG. 4 and FIG. 11 to be described later).

Figure 6:
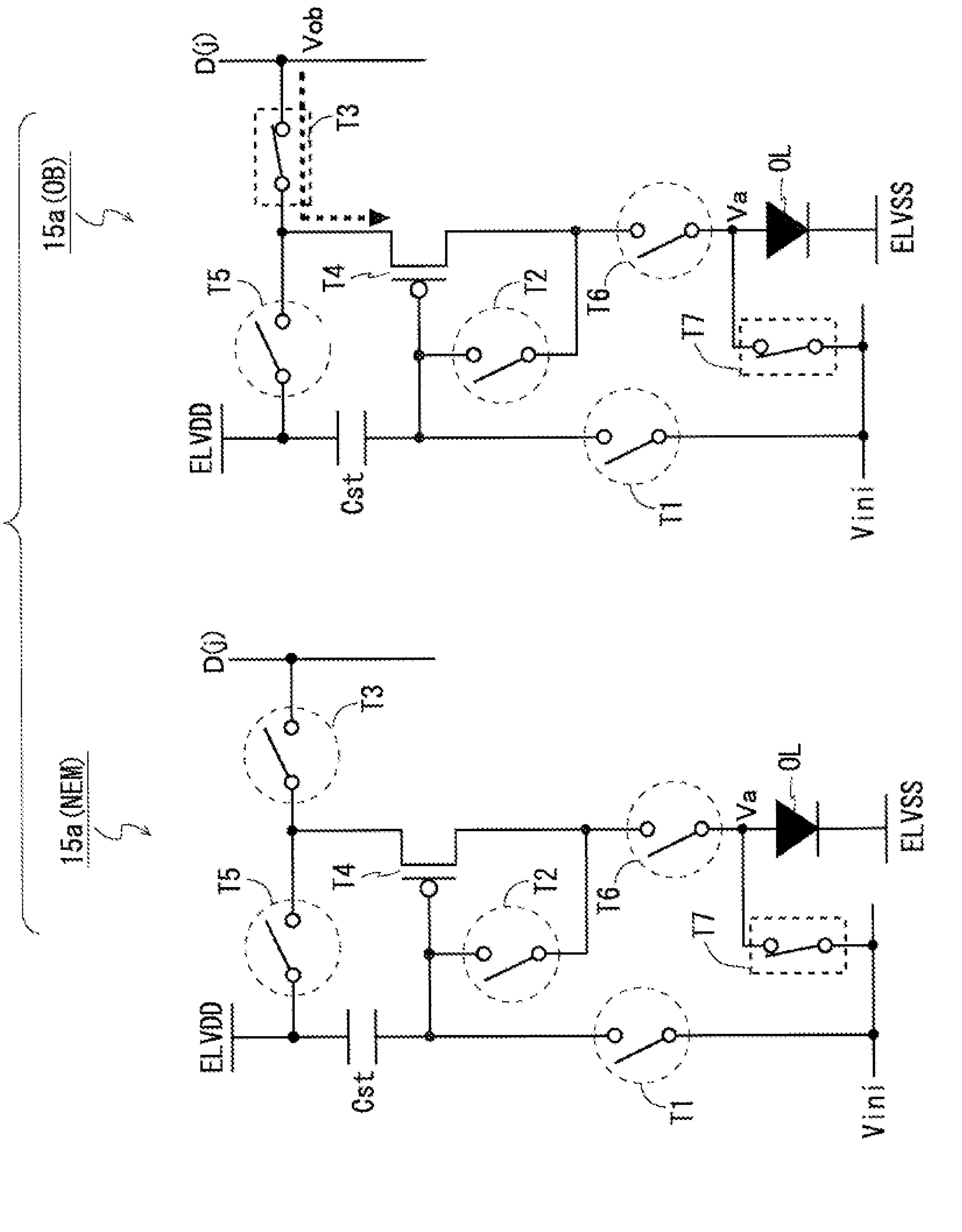
FIG. 6 includes circuit diagrams for describing respective ones of a light-off operation (without on-bias application) and art on-bias application operation of the pixel circuit in the comparative example.

Accordingly, in the non-emission period from t9 to t12 within the pause period TP (NRF frame period Tnrf), the corresponding first scanning signal PS(i) changes from H level to L level at time t10. As a result, the data write control transistor T3 transitions from OFF state to ON state, and maintains ON state while the corresponding first scanning signal. PS(i) is at L level. In the non-emission period from t9 to t12 within the pause period TP, the data write control transistor T3 is in ON state from t10 to t11 (this period will be referred to below as an "on-bias application period"), during which a voltage outputted as an on-bias voltage Vob to the corresponding data signal line Dj by the data-side drive circuit 30 is applied to the source terminal of the drive transistor T4 through the data write control transistor T3. FIG. 6 include a pixel circuit 15*a*(OR) schematically representing the state of the pixel circuit Pix(i,j) at that time, i.e., the state of the circuit at the time of the on-bias application operation. Note that in FIG. 6, a pixel circuit 15*a* (NEM) schematically represents the state of the pixel circuit Pix(i,j) during the non-emission period from t9 to t12, excluding the on-bias application period from t10 and t11, within the pause period TP.

Here, the value of the on-bias voltage Vob outputted by the data-side drive circuit 30 during the on-bias application period from t10 to t11 is suitably set so as to reduce the difference between the drive period TD and the pause period TP in terms of the voltage stress that is applied to the drive transistor T4 in the non-emission period. This reduces the difference in the threshold voltage Vth of the drive transistor T4 between the start of the light-on operation at time t8 during the drive period TD and the start of the light-on operation at time t12 during the pause period TP. Thus, the difference between the drive period TD and the pause period TP is reduced in a portion that indicates a light-off operation (more specifically, a rising waveform during a transition from a light-off state to a light-on state) in a luminance waveform, resulting in less perceivable flickering during pause drive.

However, if the on-bias voltage Vob is set at a constant value, the gate-source voltage Vgs of the drive transistor T4 during the on-bias application period from t10 to t1 within the pause period TP depends on a display gradation specified by the retained voltage of the data retention capacitor Cst. In the case of, for example, the circuit configuration shown in FIG. 3, the lower the display gradation, the higher the data voltage Vdata to be written, and therefore the lower the absolute value of the gate-source voltage Vgs of the drive transistor T4 when the on-bias voltage Vob at the constant value is applied to the source terminal of the drive transistor T4. On the other hand, during the data write period from t5 to t6 within the drive period TD, the drive transistor T4 is diode-connected due to the threshold compensation transistor T2 being in ON state, and therefore the gate-source voltage Vgs of the drive transistor T4 is equal to the absolute value of the threshold voltage Vth of the drive transistor T4, regardless of the retained voltage of the data retention capacitor Cst. Accordingly, in each pixel circuit 15, the difference between the drive period TD and the pause period TP in terms of the voltage stress that is applied to the drive transistor T4 during the non-emission period varies depending on the display gradation of the pixel circuit.

Accordingly, if the on-bias voltage Vob is set at a constant value, it might not be possible to inhibit flickering simultaneously across all pixel circuits 15, i.e., all areas of a display image, resulting in an increased possibility of flickering becoming perceivable due to other factors that influence flickering. Therefore, to ensure to display a satisfactory image free from perceivable flickering across all areas of the image while performing pause drive, the display device according to the present embodiment is configured such that a suitable on-bias voltage is applied to each pixel circuit in accordance with the display gradation thereof. The pixel circuit in the present embodiment as such will be described below.

<1.3.2 Configuration and Operation of the Pixel Circuit in the First Embodiment>

FIG. 7 is a circuit diagram illustrating the configuration of the pixel circuit 15 in the present embodiment; more specifically, the circuit diagram depicts the configuration of the pixel circuit 15 corresponding to the i'th first scanning signal line PSi and the j'th data signal line Dj (where 1≤i≤n, and 1≤j≤m)), i.e., the i'th-row, j'th-column pixel circuit Pix (i,j). Similar to the pixel circuit 15*a* in the comparative example shown in FIG. 3, the pixel circuit 15 includes an organic EL element OL, which serves as a display element, seven transistors TI to T7 (which will be referred to as a "first initialization transistor T1", a "threshold compensation transistor T2", a "data write control transistor T3", a "drive transistor T4", a "first emission control transistor T5", a "second emission control transistor T6", and a "second initialization transistor T7", as in the comparative example), and a data retention capacitor Cst. The transistors T1, T2, and T7 are N-type transistors. The transistors T3 to T6 are P-type transistors. In the present embodiment, the N-type transistors TI, T2, and 7 are IGZO-TFTs, and the P-type transistors T3 to T6 are LTPS-TFTs, but this is not limiting. The data retention capacitor Cst is a capacitive element with two electrodes: first and second electrodes. When comparing FIG. 7 with FIG. 3, it can be appreciated that unlike the pixel circuit 15*a* in the comparative example, the pixel circuit 15 in the present embodiment is provided with a bias supply circuit 151, which includes a bias control transistor T8 and a bias retention capacitor Cbs. Note that in the pixel circuit 15, the transistors T1 to T3 and T5 to T8, i.e., all the transistors excluding the drive transistor T4, function as switching elements.

In the present embodiment in FIG. 7, as in the comparative example in FIG. 3, the pixel circuit Pix (i,j) is connected to the second scanning signal line NSi that corresponds to the pixel circuit Pix(i,j) (corresponding second scanning signal line), the second scanning signal line that is two lines prior to the corresponding second scanning signal line NSi, i.e., the i−2'th second scanning signal line NSi−2 (preceding second scanning signal line), the first scanning signal line PSi that corresponds to the pixel circuit Pix(i,j) (corresponding first scanning signal line), the emission control line EMi that corresponds to the pixel circuit Pix(i,j) (corresponding emission control line), the data signal line Dj that corresponds to the pixel circuit Pix(i,j) (corresponding data signal line), the initialization voltage line Vini, the high-level power supply line ELVDD, and the low-level power supply line ELVSS. In addition to the above, the pixel circuit Pix(i,j) in the present embodiment is also connected to the bias control line BSi that corresponds thereto. Note that the pixel circuit Pix(i,j) may be connected to the second scanning signal line that is one line prior to the corresponding second scanning signal line NSi, in place of the preceding second scanning signal line NSi−2.

In the pixel circuit Pix(i,j) in the present embodiment, the connection relationship among the components T1 to T7, Cst, and OL, and the connection relationship of the components TI to T7, Cst, and OL to the signal lines NSi, NSi−2, PSi, EMi, and Dj, the power supply lines ELVDD and ELVSS, and the initialization voltage line Vini, all of which are connected to the pixel circuit Pix(i,j), are as shown in FIG. 7 and also the same as in the connection configuration of the pixel circuit Pix(i,j) in the comparative example (see FIG. 3).

In the bias supply circuit 151 provided in the pixel circuit 15 in the present embodiment, the bias control transistor T8 and the bias retention capacitor Cbs are connected in series with each other. The bias control transistor T8 has a gate terminal connected to the corresponding bias control line BSi. and a drain terminal connected to a node (referred to below as a "first node") N1 including a connecting point of the data write control transistor T3, the drive transistor T4, and the first emission control transistor T5. The drive transistor T4 has a source terminal connected to the high-level power supply line ELVDD through the bias control transistor T8 and the bias retention capacitor Cbs. The bias retention capacitor Cbs has a capacitance value being set sufficiently larger than a capacitance value of parasitic capacitance formed between the first node N1 and another node.

Figure 8:
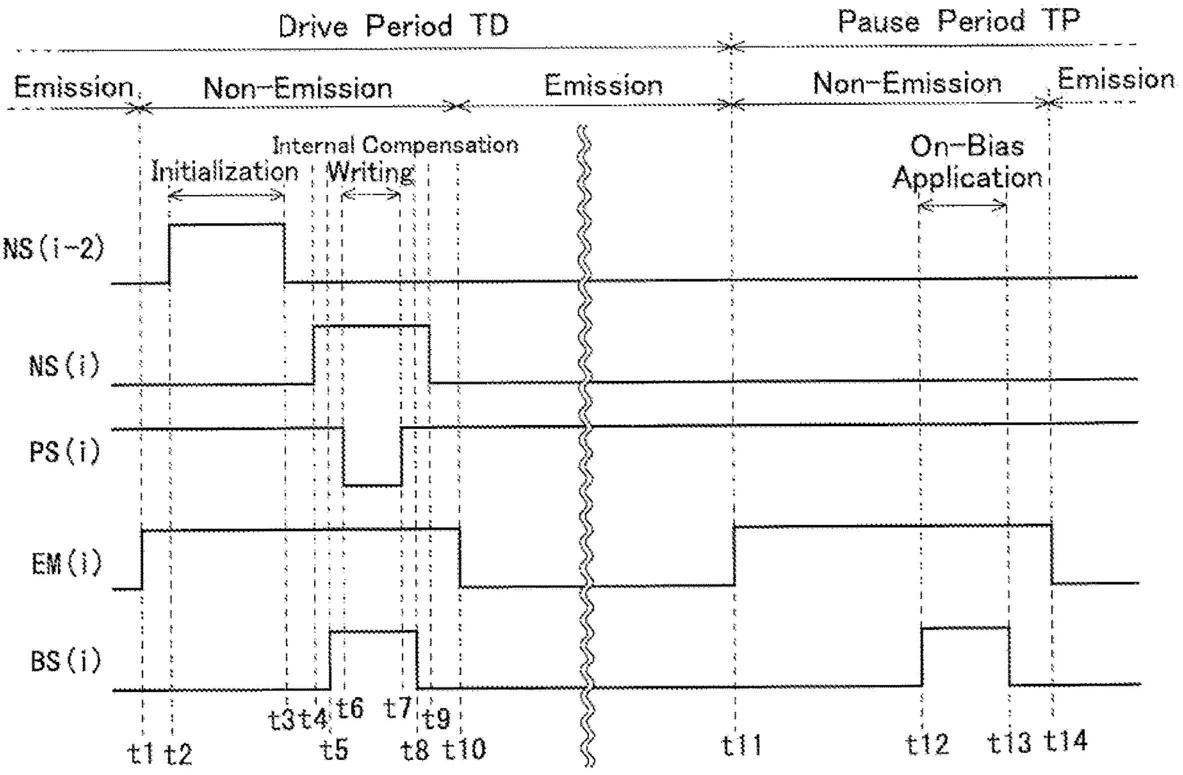
FIG. 8 is a timing chart for describing the operation of the pixel circuit in the first embodiment.

Next, the operation of the pixel circuit 15 shown in FIG. 7, i.e., the i'th-row, j'th-column pixel circuit Pix(i,j) in the present embodiment, will be described with reference to FIG. 8 together with FIG. 7. FIG. 8 is a timing chart for describing the operation of the pixel circuit Pix(i,j) during the non-emission period, which is included in each frame period.

When comparing FIG. 8 with FIG. 4, it can be appreciated that during the drive period TD (RF frame period Trf), the first scanning signal PS(i), the second scanning signals NS(i) and NS(i−2), the emission control signal EM (i), and the data signal D(j), which are used to drive the pixel circuit 15 in the present embodiment, exhibit similar changes to those used to drive the pixel circuit 15*a* in the comparative example. Accordingly, the transistors T1 to T3 and T5 to T7 included in the pixel circuit 15 in the present embodiment as switching elements operate in a similar manner to those included in the pixel circuit 15*a* in the comparative example as switching elements, and therefore the initialization operation and the data write operation are performed similarly in both the present embodiment and the comparative example. Note that during the pause period TP (NRF frame period Tnrf), the first scanning signal PS(i) provided to the pixel circuit 15*a* in the comparative example exhibits similar changes to those seen during the drive period TD (RF frame period Trf), as shown in FIG. 4, but the first scanning signal PS(i) provided to the pixel circuit 15 according to the present embodiment is kept at H level, as shown in FIG. 8.

Furthermore, as described earlier, the pixel circuit 15 in the present embodiment is configured by additionally providing the bias supply circuit 151, which includes the bias control transistor T8 and the bias retention capacitor Cbs, to the pixel circuit in the comparative example (see FIG. 7), and the bias control transistor T8 is provided at a gate terminal with a bias control signal BS(i) (referred to below as a "corresponding bias control signal BS(i)") through the corresponding bias control line BSi. As shown in FIG. 8, in the drive period TD (RF frame period Trf), the bias control signal BS(i) changes from L level to H level at time t5 and from H level to L level at time t8. Moreover, in the pause period TP (NRF frame period Tnrf), the bias control signal BS(i) also exhibits similar changes to those seen in the drive period TD (RF frame period Trf). More specifically, in the non-emission period from t11 to t14 within the NRF frame period Tnrf, the bias control signal BS(i) changes from L level to H level at time t12 and from H level to L level at time t13.

Figure 9:
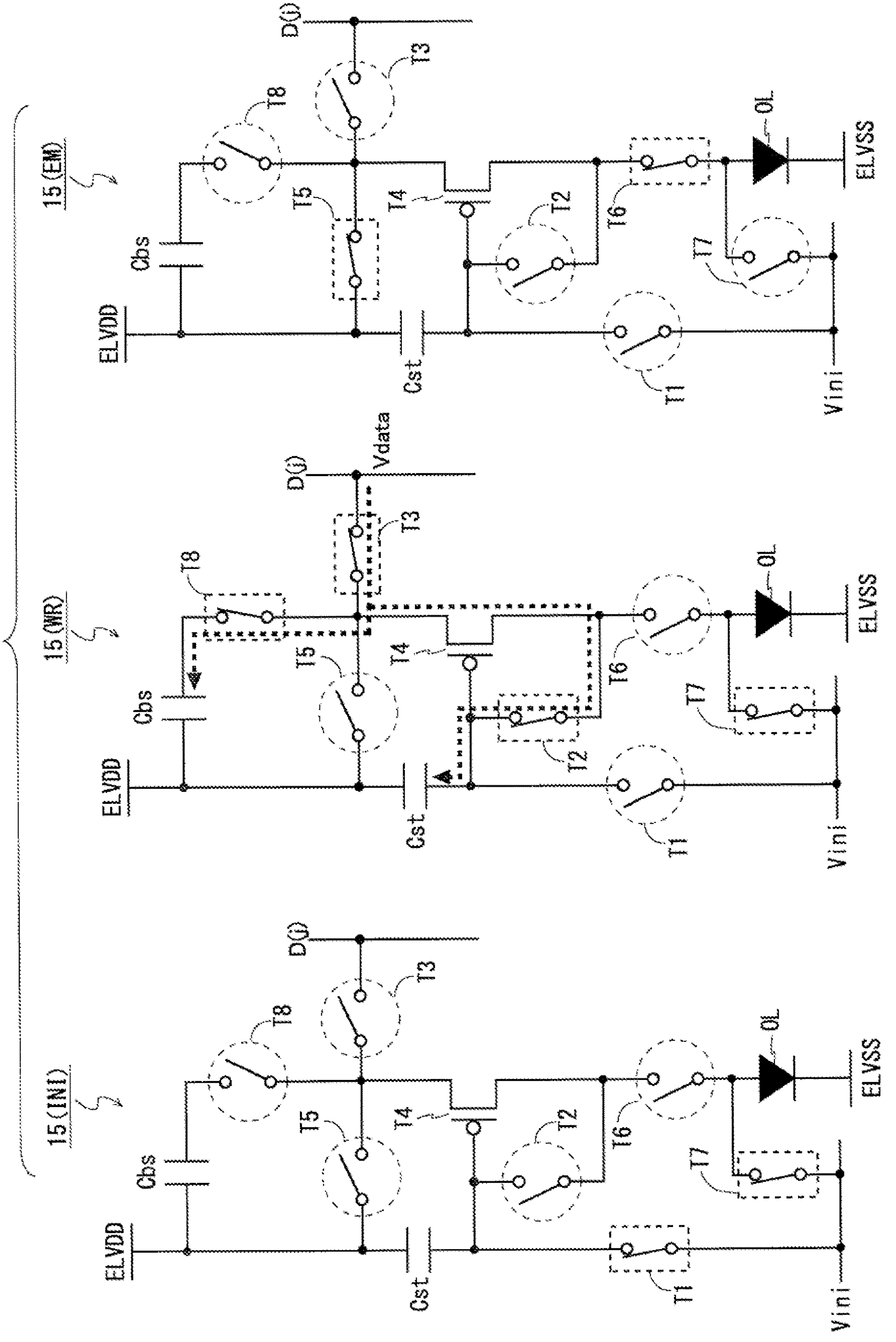
FIG. 9 includes circuit diagrams for describing respective ones of an initialization operation, a data write operation, and a light-on operation of the pixel circuit in the first embodiment.

FIG. 9 is a diagram illustrating states of the pixel circuit Pix(i,j) in the present embodiment at the time of some operations in the drive period TV. FIG. 9 includes pixel circuits 15 (INI), 15 (WR), and 15 (EM), the pixel circuit 15(INI) schematically represents the state of the pixel circuit Pix(i,j) during the initialization period from t2 to t3, i.e., the state of the circuit at the time of the initialization operation, the pixel circuit 15(WR) schematically represents the state of the pixel circuit Pix(i,j) during the data write period from t6 to t7, i.e., the state of the circuit at the time of the data write operation, and the pixel circuit. 15(EM) schematically represents the state of the pixel circuit Pix(i,j) during the emission period, i.e., the state of the circuit at the time of the light-on operation.

In the present embodiment, the bias control signal BS (i) is at H level from t5 to t8, including the data write period from t6 to t7, and therefore the bias control transistor T8 is in ON state during the data write period from t6 to t7. Accordingly, as can be appreciated from looking at the pixel circuit 15 (WR) at the time of the data write operation shown in FIG. 9, in the data write period from t6 to t7, a voltage of the corresponding data signal line Dj (i.e., a voltage of the data signal D(j)) is written to the data retention capacitor Cst as a data voltage through the data write control transistor T3 in ON state and the drive transistor T4 being diode-connected, and also to the bias retention capacitor Cbs through the data write control transistor T3 and the bias control transistor T8, both of which are in ON stare. Therefore, in the data write period from t6 to t7, the voltage of the corresponding data signal line Dj at the time, i.e., the data voltage Vdata, is written and retained in the bias retention capacitor Cbs as well.

Figure 10:
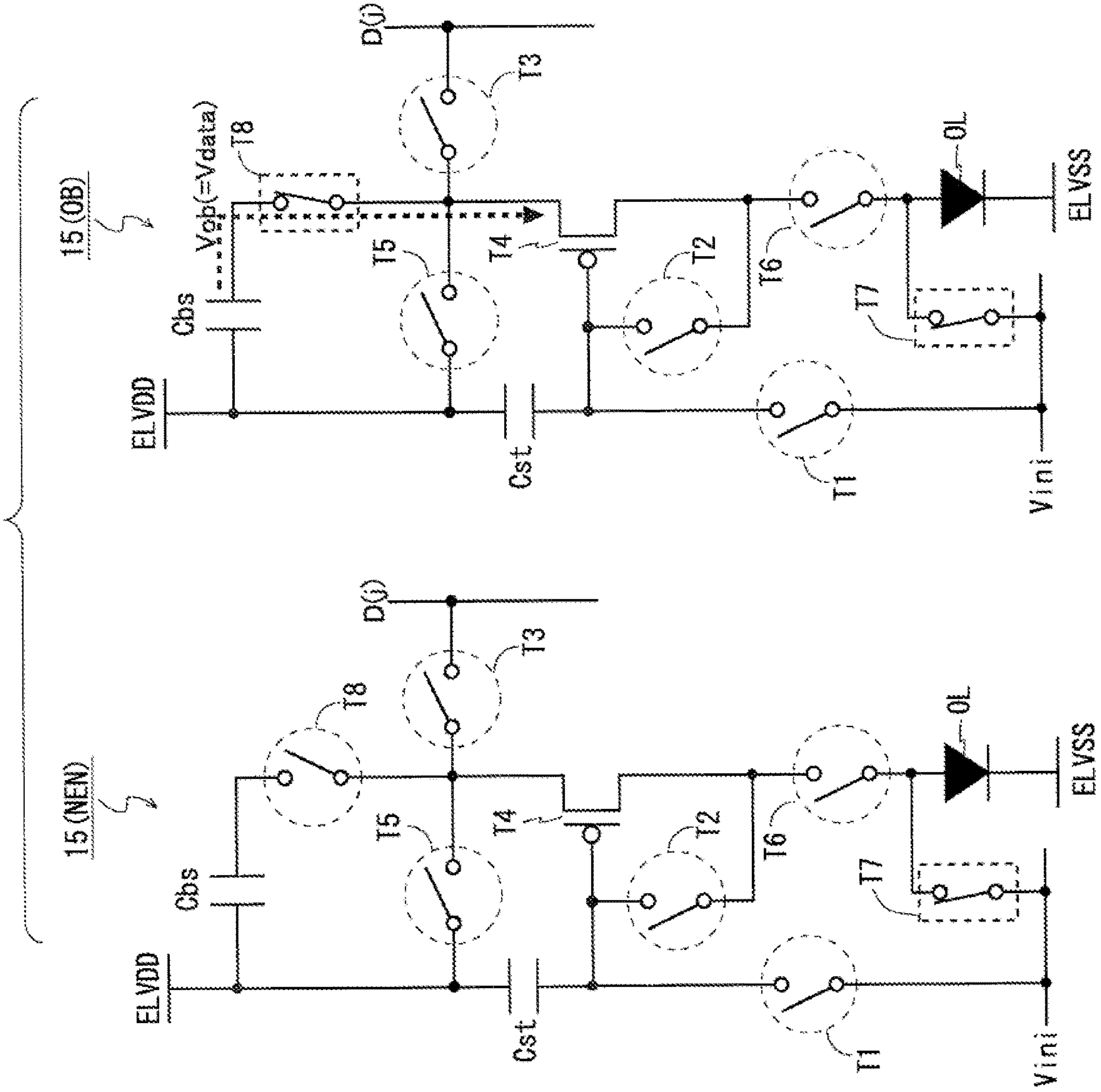
FIG. 10 includes circuit diagrams for describing respective ones of a light-off operation (without on-bias application) and an on-bias application operation of the pixel circuit in the first embodiment.

FIG. 10 is a diagram illustrating states of the pixel circuit Pix(i,j) in the present embodiment at the time of some operations in the pause period TP. FIG. 10 includes pixel circuits 15(OB) and 15(NEM), the pixel circuit 15(OB) schematically represents the state of the pixel circuit Pix(i,j) in the on-bias application period from t12 to t13, during which the bias control signal BS(i) is at H level, within the non-emission period from t11 to t14, i.e., the state of the circuit at the time of the on-bias application operation, and the pixel circuit 15(NEM) schematically represents the state of the pixel circuit Pix(i,j) in the non-emission period from t11 to t14, excluding the on-bias application period from t12 to t13.

In the on-bias application period from t12 to t13, during which the bias control signal BS (i) is at H level, within the pause period TP (NRF frame period Tnrf), the data write control transistor T3 and the first emission control transistor T5 are in OFF state, and the bias control transistor T8 is in ON state, as can be appreciated from looking at the pixel circuit 15(GB) at the time of the on-bias application operation shown in FIG. 10. As a result, the data voltage Vdata, which is retained in the bias retention capacitor Cbs in the data write period from t6 to t7 within the immediately preceding drive period TD (RF frame period Trf), is applied to the source terminal of the drive transistor T4 as an on-bias voltage Vob. On the other hand, in the data write period from t6 to t7, the writing of the data voltage to the data retention capacitor Cst is performed along with internal compensation, as described earlier, with the result that the voltage at the gate terminal (gate voltage Vg) of the drive transistor T4 takes a value as given by equation (1). The gate voltage Vg corresponds to the retained voltage of the bias retention capacitor Cbs and is maintained during the immediately following pause period TP. Accordingly, the drive transistor T4 has a voltage applied between the gate and source terminals during the on-bias application period from t12 to t13, and the applied voltage corresponds to the threshold voltage Vth, regardless of the display gradation that is specified by the retained voltage of the data retention capacitor Cst. In the present embodiment, the emission control signal EM(i) and the bias control signal BS(i) exhibit respective similar patterns of change during both the drive period TD and the pause period TP, as shown in FIG. 8, and therefore the on-bias voltage Vob as above is applied to the source terminal of the drive transistor 74 during any NRF frame period Tnrf within the pause period TP. Note that as described earlier, the capacitance value of the bias retention capacitor Cbs is sufficiently larger than the capacitance value of parasitic capacitance formed between the first node N1 and another node, and therefore even if on-bias application is repeated multiple times per writing of the data voltage to the bias retention capacitor Cbs during the pause period TP, the retained voltage of the bias retention capacitor Cbs barely changes.

<1.4 Effects>

Effects of the present embodiment will be described below while comparing the present embodiment with the comparative example in terms of the light-off operation during the pause drive mode.

Figure 11:
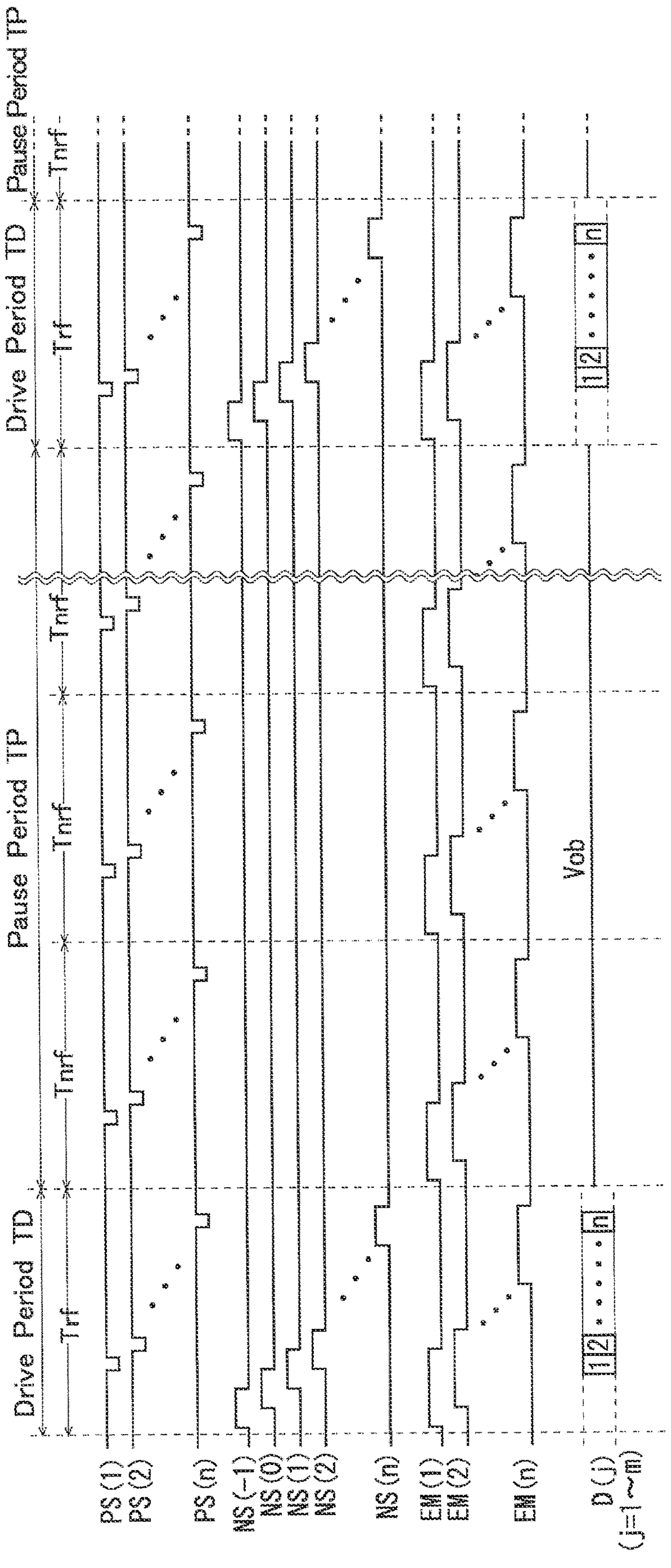
FIG. 11 is a timing chart for describing a method for driving the display device according to the comparative example.

In the comparative example, as can be appreciated from FIGS. 2 and 4, the pixel circuits Pix(1,1) to Pix(n,m) In the display portion 11 are driven by the first scanning signals PS(1) to PS(n), the second scanning signals NS(−1) to NS (n), the emission control signals EM(1) to EM(n), and the data signals D(1) to D(m) as shown in FIG. 11. On the other hard, in the present embodiment, as can be appreciated from FIGS. 2 and 8, the pixel circuits Pix (1,1) to Pix (n,m) in the display portion 11 are driven by the first scanning signals PS (1) to PS (n)), the second scanning signals NS (−1) to NS(n), the bias control signals BS(O) to BS(n), the emission control signals EM(1) to EM(n), and the data signals D(1) to D(m) as shown in FIG. 12.

Figure 13:
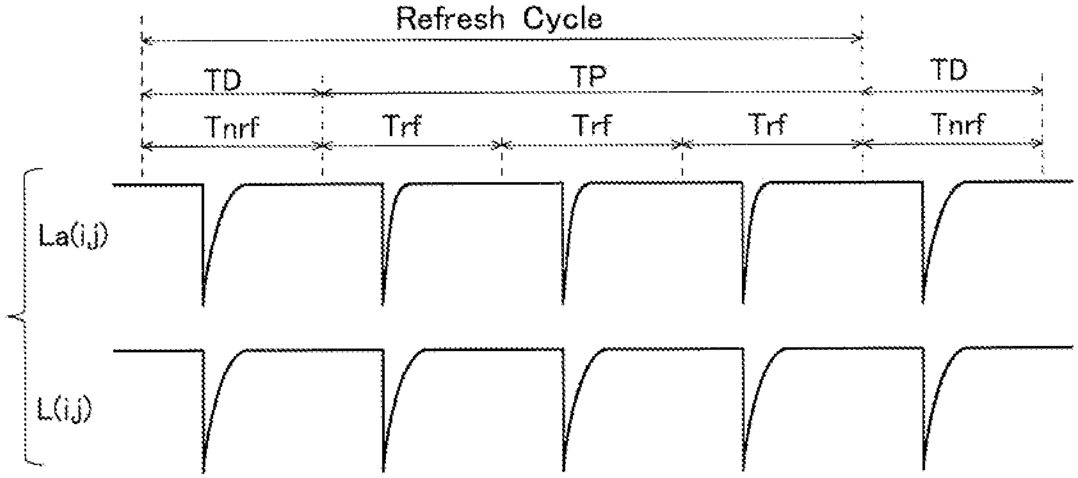
FIG. 13 is a waveform diagram for describing the light-off operations in the first embodiment and the comparative example.
Figure 14:
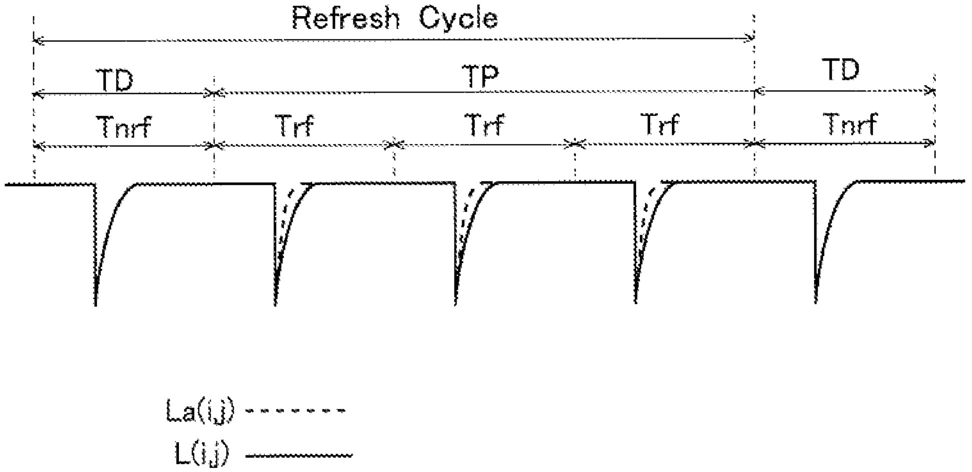
FIG. 14 is a waveform diagram for describing the difference in light-off waveform between the first embodiment and the comparative example.

FIG. 13 shows a luminance waveform La (i,j) of the pixel circuit Pix(i,j) in the comparative example as driven by the method shown in FIG. 11 (referred to below as a "luminance waveform in the comparative example") and a luminance waveform L(i,j) of the pixel circuit Pix(i,j) in the present embodiment as driven by the method shown in FIG. 12 (referred to below as a "luminance waveform in the present embodiment"). FIG. 14 shows the luminance waveform La(i,j) in the comparative example and the luminance waveform L(i,j) in the present embodiment as overlapping each other so as to facilitate the identification of the difference therebetween, with the luminance waveform La(i,j) in the comparative example represented by a dotted line and the luminance waveform L(i,j) in the present embodiment represented by a solid line.

As can be appreciated from FIGS. 13 and 14, in the luminance waveform La(i,j) in the comparative example, there is a difference in the portion that indicates the light-off operation (light-off waveform) between the drive period TD (RF frame period Trf) and the pause period TP (NRF frame period Tnrf). More specifically, the difference occurs in rising portions of the luminance waveform, where the emission control signal EM(i) changes from H level to L level, causing the pixel circuit Pix(i,j) to transition from a light-off state to a light-on state. In the example shown in FIGS. 13 and 14, the luminance waveform exhibits a sharper rise during the NRF frame period Tnrf compared to the RF frame period Trf. Conceivably, this is due to hysteresis characteristics of the drive transistor T4. Such a difference in the rising of the luminance waveform between the RF frame period Trf and the NRF frame period Tnrf can be reduced by changing the on-bias voltage Vob applied by the data-side drive circuit 30 through the corresponding data signal line Dj and the data write control transistor T3 to the source terminal of the drive transistor T4 during the on-bias application period from t10 to t11 (see FIG. 4 and the pixel circuit 15*a*(GB) at the time of the on-bias application operation shown in FIG. 6). However, the gate voltage Vg of the drive transistor T4 during the on-bias application period from t10 to t11 depends on the display gradation that is specified by the retained voltage of the data retention capacitor Cst. Accordingly, to sufficiently reduce such a difference in the rising portion of the luminance waveform, it is necessary to adjust, for each pixel circuit Pix(i,j), the value of the on-bias voltage Vob to be provided to the pixel circuit Pix (i,j), in accordance with the display gradation of the pixel circuit Pix(i,j). However, achieving such adjustments to the on-bias voltage Vob is difficult in the display device in the comparative example. Accordingly, in the display device in the comparative example, the on-bias voltage Vob is typically set as a constant value. In this case, the difference in the rising portion of the luminance waveform cannot be sufficiently reduced across all the pixel circuits 15*a*. Thus, it is difficult to inhibit flickering simultaneously across all areas of a display image, and there is a high possibility that flickering becomes perceivable due to other factors that influence flickering.

On the other hand, in the present embodiment, for each pixel circuit Pix(i,j) (see FIG. 7), the data voltage Vdata, i.e., the voltage of the corresponding data signal line Dj, is also provided and retained in the bias retention capacitor Cbs through the data write control transistor T3 and the bias control transistor T8, both of which are in ON state, in the data write period from t6 to t7 within the drive period TD (RF frame period Trf) (see FIG. 8 and the pixel circuit 15(WR) at the time of the data write operation shown in FIG. 9). In each NRF frame period Tnrf within the pause period TP following the drive period TD, the data voltage Vdata retained in the bias retention capacitor Cbs is applied to the source terminal of the drive transistor T4 as the on-bias voltage Vob through the bias control transistor T8 in ON state during the on-bias application period from t12 to t13 (see the pixel circuit 15(OB) at the time of the on-bias application operation shown in FIG. 10). In this manner, for each pixel circuit Pix(i,j), the data voltage Vdata, which specifies the display gradation of the pixel circuit Pix(i,j), is applied to the source terminal of the drive transistor T4, with the result that during the on-bias application period from t12 to t13, the gate-source voltage Vgs of the drive transistor T4 becomes approximately equal to that during the data write period from t6 to t7 within the immediately preceding drive period TD, without depending on the display gradation. As a result, the difference in the rising portion of the luminance waveform between the RF frame period Trf and the NPF frame period Tnrf is simultaneously reduced to a sufficient degree across all the pixel circuits 15. Thus, flickering can be inhibited simultaneously across all areas of a display image, and can also be rendered less perceivable even if other factors that influence flickering shifts an optimal value for the on-bias voltage Vob.

2. SECOND EMBODIMENT

Next, an organic EL display device according to a second embodiment will be described with reference to FIGS. 15 to 18. This organic EL display device is provided with first bias control lines BS11 to BS1*n* and second bias control lines BS21 to BS2*n*, in place of the bias control lines BS1 to BSn of the display device according to the first embodiment, the first bias control lines BS11 to BS1*n* serve as bias write control lines, and the second bias control lines BS21 to BS2*n* serve as bias application control lines. In the present embodiment, each pixel circuit corresponds to one of the n first bias control lines BS11 to BS1*n* and one of the n second bias control lines BS21 to BS2*n*. The scanning-side drive circuit is configured to apply first bias control signals BS1(1) to BS1(*n*) to the first bias control lines BS11 to BS1*n*, respectively, and second bias control signals BS2 (1) to BS2

(*n*) to the second bias control lines BS21 to BS2*n*, respectively. Moreover, in the present embodiment, the pixel circuit is provided with a bias supply circuit as in the first embodiment, but the bias supply circuit in the present embodiment has a different configuration from that in the first embodiment. Other than this, the display device according to the present embodiment is fundamentally identical in configuration to the display device according to the first embodiment, and therefore the same or corresponding elements are denoted by the same reference characters and will not be elaborated upon (see FIGS. 1 and 2).

Figure 15:
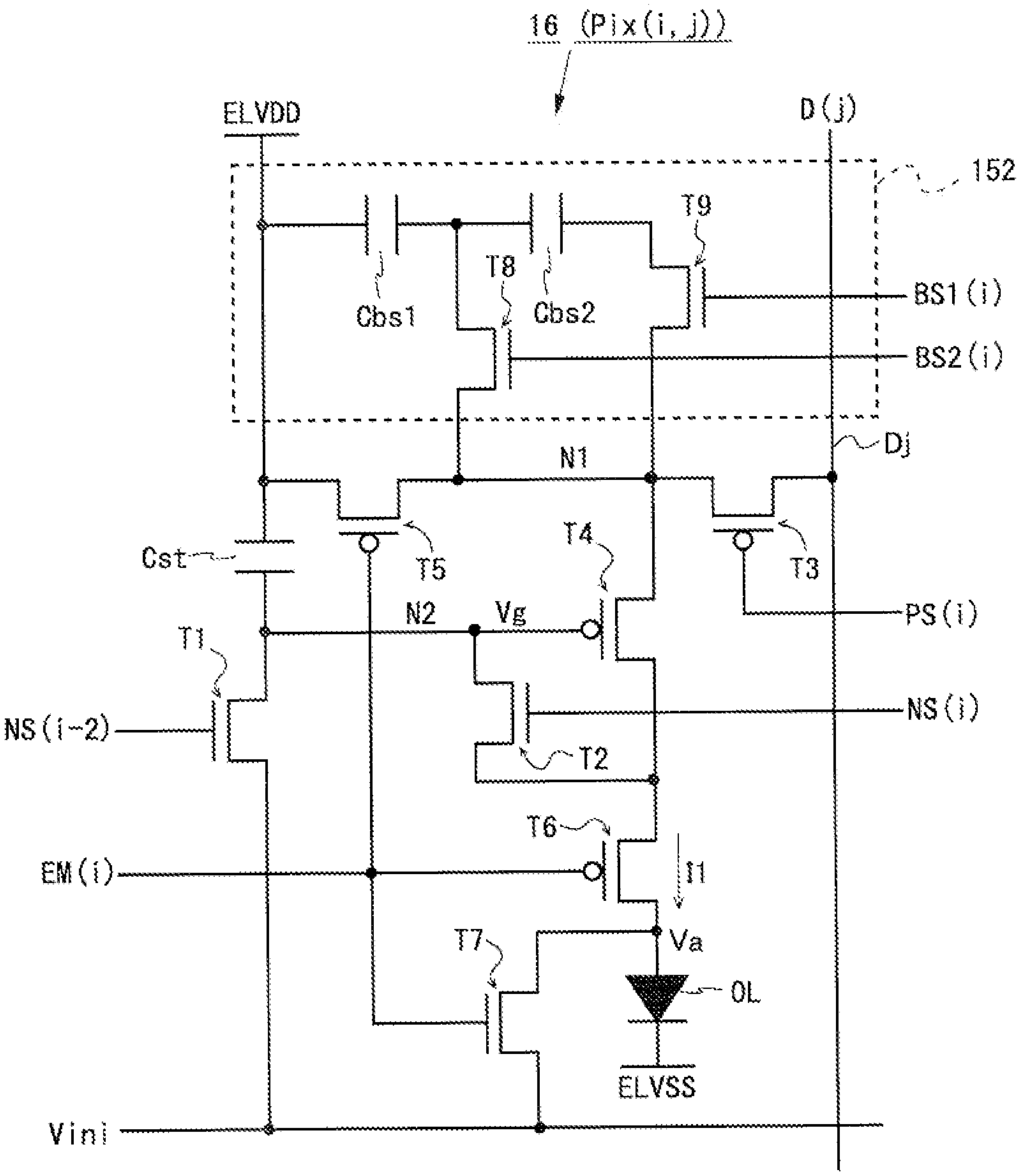
FIG. 15 is a circuit diagram illustrating the configuration of a pixel circuit in a display device according to a second embodiment.

FIG. 15 is a circuit diagram illustrating the configuration of the pixel circuit 16 in the present embodiment; more specifically, the circuit diagram depicts the configuration of the pixel circuit 16 corresponding to the i'th first scanning signal line PSi and the j'th data signal line Dj (where 1≤i≤n, and 1≤j≤m), i.e., the i'th-row, j'th-column pixel circuit Pix (i,j). The pixel circuit 16 has the same configuration as the pixel circuit 15 in the first embodiment (FIG. 7), except for the bias supply circuit 152. Accordingly, all the elements of the pixel circuit 16, excluding the bias supply circuit 152, are denoted by the same reference characters as those of the pixel circuit 15 in the first embodiment and will not be elaborated upon.

As shown in FIG. 15, the i'th-row, j'th-column pixel circuit Pix(i,j), i.e., the pixel circuit 16 in the present embodiment, is connected to the first and second bias control lines BS1*i* and BS2*i* that correspond thereto, in addition to the corresponding first scanning signal line PSi, the corresponding second scanning signal line NSi, the preceding second scanning signal line NSi−2, the corresponding emission control line EMi, the corresponding data signal line Dj, the initialization voltage line Vini, the high-level power supply line ELVDD, and the low-level power supply line ELVSS. Moreover, the bias supply circuit 152 provided in the pixel circuit 16 includes a bias application control transistor T8, a bias write control transistor T9, a bias retention capacitor Cbs1, and a voltage dividing capacitor Cbs2. The bias write control transistor T9 functions as a switching element with a gate terminal connected to the first bias control line BS1*i* that corresponds to the pixel circuit Pix(i,j) (referred to below as the "corresponding first bias control line"). Moreover, the bias application control transistor T8 functions as a switching element corresponding to the bias control transistor T9 in the first embodiment, with a gate terminal connected to the second bias control line BS2*i* that corresponds to the pixel circuit Pix(i,j) (referred to below as the "corresponding second bias control line"). The drive transistor T4 is connected at a source terminal to the high-level power supply line ELVDD through the bias application control transistor T8 and the bias retention capacitor Cbs1, in this order, and also to a connecting point of the bias retention capacitor Cbs1 and the bias application control transistor T8 through the bias write control transistor T9 and the voltage dividing capacitor Cbs2. In the present embodiment also, since the drive transistor T4 is connected at the source terminal to the corresponding data signal line Dj through the data write control transistor T3, the corresponding data signal line Dj is connected to the connecting point of the bias retention capacitor Cbs1 and the bias application control transistor T8 through the bias write control transistor T9 and the voltage dividing capacitor Cbs2. Note that the bias retention capacitor Cbs1 and the voltage dividing capacitor Cbs2 are connected in series with each other to constitute a voltage divider circuit.

Figure 16:
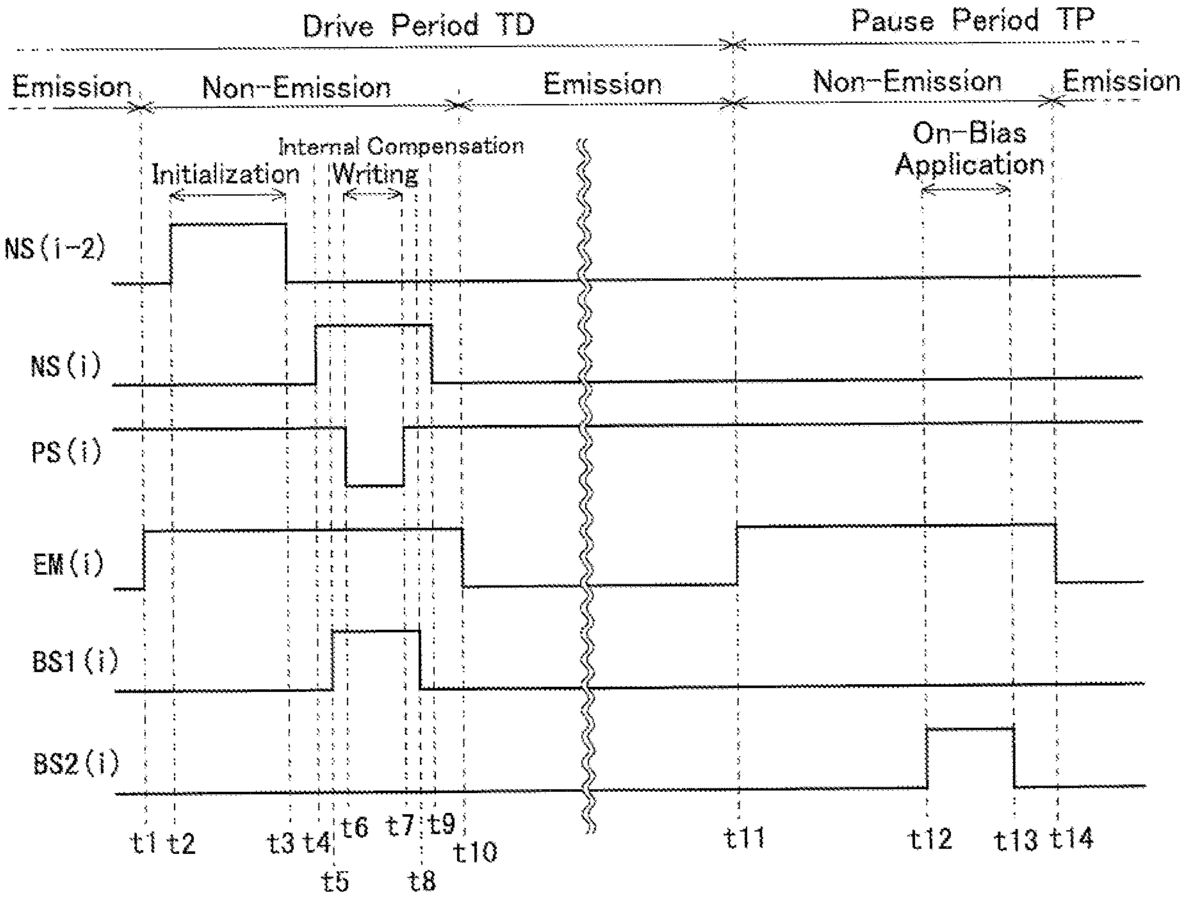
FIG. 16 is a timing chart for describing the operation of the pixel circuit in the second embodiment.

Next, the operation of the pixel circuit 16 shown in FIG. 15, i.e., the i'th-row, j'th-column pixel circuit Pix(i,j) in the present embodiment, will be described with reference to FIG. 16 together with FIG. 15. FIG. 16 is a timing chart for describing the operation of the pixel circuit Pix(i,j) during the non-emission period, which is included in each frame period.

When comparing FIG. 16 with FIG. 8, it can be appreciated that during the drive period TD (RF frame period Trf), the first scanning signal PS(i), the second scanning signals NS(i) and NS(i−2), the emission control signal EM (i), and the data signal D(j), which are used to drive the pixel circuit Pix(i,j) in the present embodiment, exhibit similar changes to those used to drive the pixel circuit Pix(i,j) in the first embodiment. Therefore, in the present embodiment, the transistors T1 to T3 and T5 to T7 included in the pixel circuit 15 as switching elements operate in the same manner as in the first embodiment and thereby perform the same initialization operation and data write operation as in the first embodiment.

As shown in FIG. 15, in the bias supply circuit 152 provided in the pixel circuit 16 in the present embodiment, the bias write control transistor T9 is supplied at a gate terminal with a first bias control signal BS1(*i*) (referred to below as a "corresponding first bias control signal. BS1(*i*)") as a bias write control signal through the corresponding first bias control line BS1*i*, and the bias application control transistor T8 is supplied at a gate terminal with a second bias control signal BS2(*i*) (referred to below as a "corresponding second bias control signal BS2 (*i*)") as a bias application control signal through the corresponding second bias control line BS2*i*. As shown in FIG. 16, in the drive period TD (RF frame period Trf), the corresponding first bias control signal BS1(*i*) changes from L level to H level at time t5, and from H level to L level at time t3. The first bias control signal. BS1(*i*) is maintained at L level during the pause period TP (NRF frame period Tnrf). On the other hand, the corresponding second bias control signal BS2(*i*) is maintained at L level during the drive period TD (RF frame period Trf), and changes from L level to H level at time t12 and from H level to L level at time t13 in the non-emission period from t11 to t14 within the pause period TP (NRF frame period Tnrf). In this manner, during the drive period TD, the corresponding first bias control signal BS1 (*i*) exhibits similar changes to the corresponding bias control signal BS (i) in the first embodiment, and during the pause period TP, the corresponding second bias control signal BS2(*i*) exhibits similar changes to the corresponding bias control signal BS(i) in the first embodiment (see FIGS. 8 and 16). Note that as in the first embodiment, the period from t12 to t13, during which the second bias control signal BS2(*i*) is kept at H level, within the pause period TP is referred to as the "on-bias application period".

Figure 17:
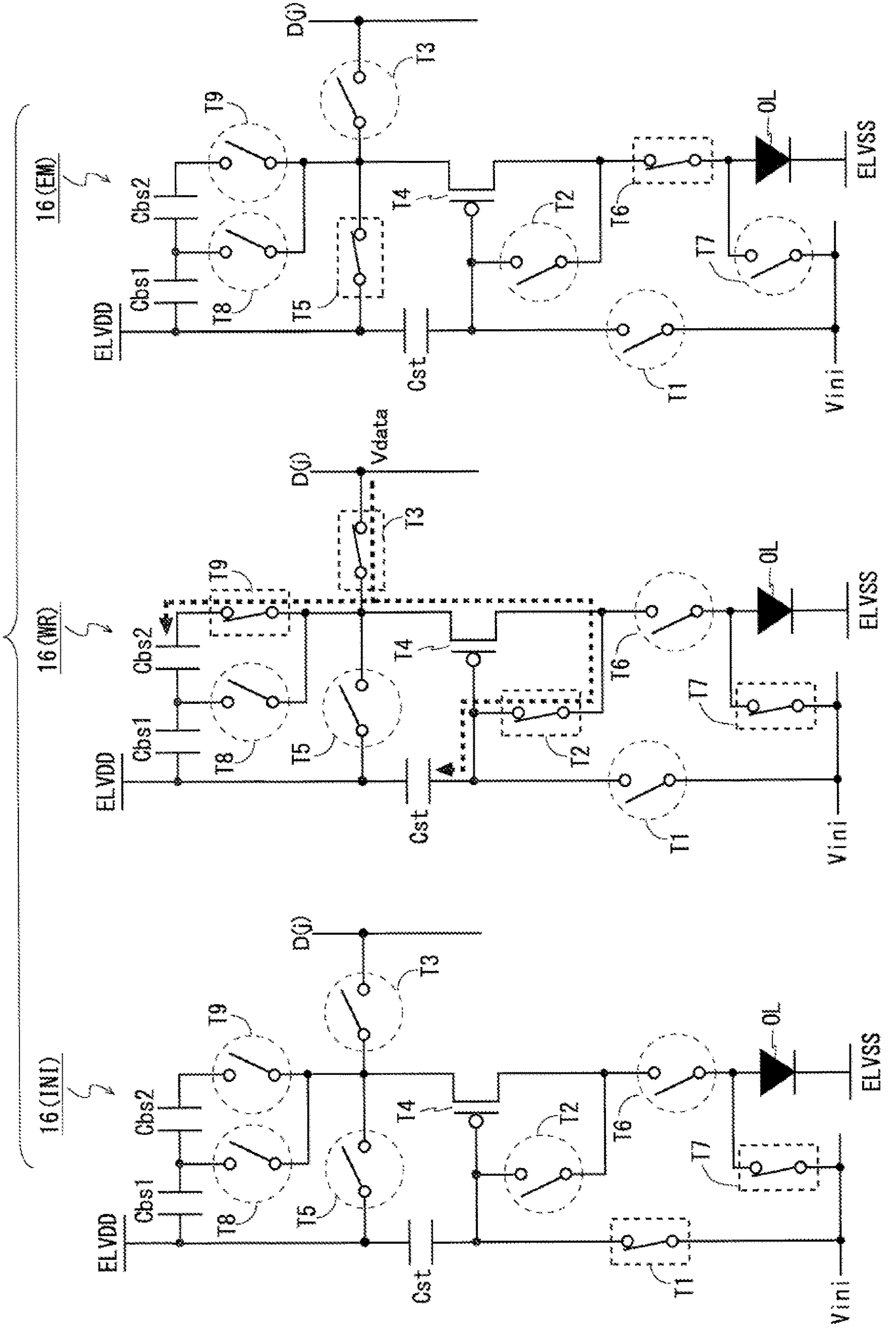
FIG. 17 includes circuit diagrams for describing respective ones of an initialization operation, a data write operation, and a light-on operation of the pixel circuit in the second embodiment.

FIG. 17 is a diagram illustrating states of the pixel circuit Pix(i,j) in the present embodiment at the time of some operations in the drive period TD. FIG. 17 includes pixel circuits 16(INI), 16(WR), and 16(EM), the pixel circuit 16 (INT) schematically represents the state of the pixel circuit Pix(i,j) during the initialization period from t2 to t3, i.e., the state of the circuit at the time of the initialization operation, the pixel circuit 16(WR) schematically represents the state of the pixel circuit Pix(i,j) during the data write period from t6 to t7, i.e., the state of the circuit at the time of the data write operation, and the pixel circuit 16(EM) schematically represents the state of the pixel circuit Pix(i,j) during the emission period, i.e., the state of the circuit at the time of the light-on operation.

In the present embodiment, the first bias control signal BS1(*i*) is at H level from t5 to t8, including the data write period from t6 to t7, and therefore in the pixel circuit Pix(i,j), the bias write control transistor T9 is in ON state during the data write period from t6 to t7. Accordingly, as can be appreciated from looking at the pixel circuit 16 (WR) at the time of the data write operation shown in FIG. 17, a voltage of the corresponding data signal line Dj (i.e., a voltage of the data signal D(j)) during the data write period from t6 to t7 is written as a data voltage Vdata to the data retention capacitor Cst through the data write control transistor T3 in ON state and the drive transistor T4 being diode-connected, and also to the voltage divider circuit, which consists of the bias retention capacitor Cbs1 and the voltage dividing capacitor Cbs2, through the data write control transistor T3 and the bias write control transistor T9, both of which are in ON state. Thus, during the data write period from t6 to t7, the voltage of the corresponding data signal line Dj, i.e., the data voltage Vdata, is provided and retained in the voltage divider circuit.

Figure 18:
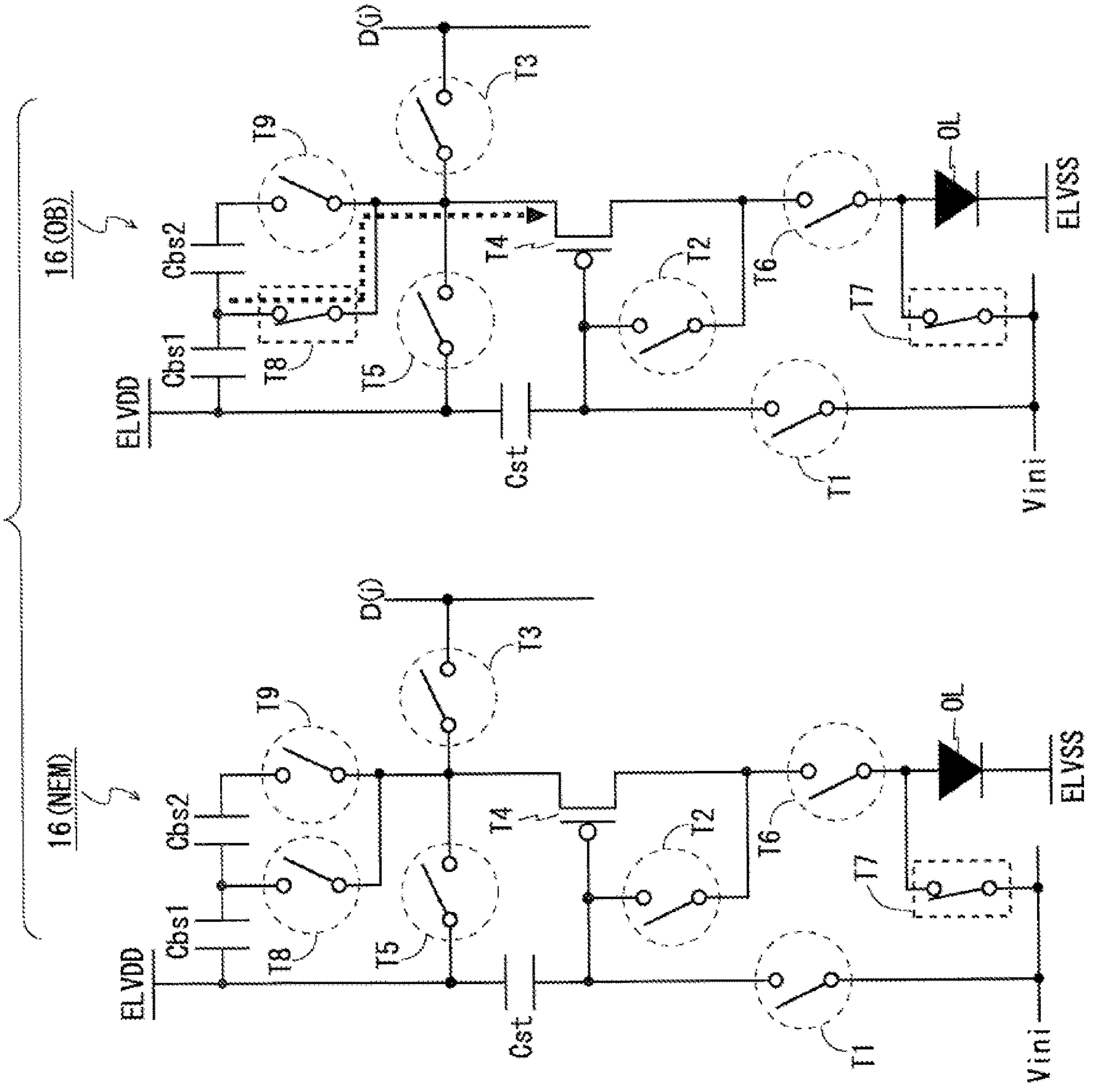
FIG. 18 includes circuit diagrams for describing respective ones of a light-off operation (without on-bias application) and an on-bias application operation of the pixel circuit in the second embodiment.

FIG. 18 is a diagram illustrating states of the pixel circuit Pix (i,j) in the present embodiment at the time of some operations within the pause period TP. FIG. 18 includes pixel circuits 16(NEM) and 16(OB), the pixel circuit 16(NEM) schematically represents the state of the pixel circuit Pix (i,j) in the non-emission period from t11 to t14, excluding the on-bias application period from t12 to t13, during which the corresponding second bias control signal BS2(*i*) is at 1 level, and the pixel circuit. 16(OB) schematically represents the state of the pixel circuit Pix(i,j) in the on-bias application period from t12 to t13, during which the corresponding second bias control signal BS2(*i*) is at H level, within the non-emission period from t11 to t14, i.e., the state of the circuit at the time of the on-bias application operation.

In the on-bias application period from t12 to t13, during which the corresponding second bias control signal BS2(*i*) is at H level, within the pause period TP (NRF frame period Tnrf), the data write control transistor T3, the first emission control transistor T5, and the bias write control transistor T9 are in OFF state, and the bias application control transistor T8 is in ON state (see the pixel circuit 16(OB) at the time of the on-bias application operation shown in FIG. 18). As a result, the drive transistor T4 has an on-bias voltage applied to the source terminal, the on-bias voltage being a voltage Vob as given by the following equation and provided by the bias retention capacitor Cbs1 and the voltage dividing capacitor Cbs2 dividing the difference between the high-level power supply voltage ELVDD and the data voltage Vdata, which has been retained in the voltage divider circuit since the data write period from t6 to t7 within the immediately preceding drive period TD.

$$Vob = ELVDD + (Vdata - ELVDD)\{Cbs2/(Cbs1 + Cbs2)\}, \quad (2)$$

where the symbols "Cbs1" and "Cbs2" represent respective capacitance values of the bias retention capacitor Cbs1 and the voltage dividing capacitor Cbs2.

In this manner, in the present embodiment, as in the first embodiment, the on-bias voltage Vob, which corresponds to the display gradation that is specified by the voltage retained in the data retention capacitor Cst, is applied to the source terminal of the drive transistor T4 during the on-bias application period from t12 to t13 within each NRF frame period Tnrf of the pause period TP. However, in the first embodiment, the data voltage Vdata during the data write period within the immediately preceding drive period TD is applied to the source terminal of the drive transistor T4 as the on-bias voltage Vob without modification, whereas in the present embodiment, the on-bias voltage Vob, as given by equation (2), is applied to the source terminal of the drive transistor T4. As can be appreciated from equation (2), in the present embodiment, the value of the on-bias voltage Vob applied to the source terminal of the drive transistor T4 can be adjusted by the capacitance ratio between the bias retention capacitor Cbs1 and the voltage dividing capacitor Cbs2.

As described above, in each pixel circuit 16 in the present embodiment, the voltage that corresponds to the display gradation of the pixel circuit 16 is applied to the source terminal of the drive transistor T4 as the on-bias voltage Vob during the on-bias application period from t12 to t13, which is set for each NRF frame period Tnrf within the pause period TP. Thus, as in the first embodiment, flickering can be inhibited simultaneously across all areas of a display image, and can also be rendered less perceivable even if other factors that influence flickering shifts an optimal value for the on-bias voltage Vob. Further, the present embodiment is configured such that the on-bias voltage Vob applied to the source terminal of the drive transistor T4 in each pixel circuit 16 can be adjusted by the capacitance ratio Cbs1/Cbs2, as can be seen from equation (2). Thus, the present embodiment renders it possible to achieve the same effects as those in the first embodiment more reliably, by setting the capacitance ratio Cbs1/Cbs2.

5. VARIANTS

The disclosure is not limited to the above embodiments, and various modifications can be made without departing from the scope of the disclosure. For example, variants as below are conceivable.

In the above embodiments, the pixel circuits 15 and 16 include both the P-type and N-type transistors, typically, the P-type transistor used is a high-mobility LTPS-TFT, and the N-type transistor used is an oxide TFT, such as an IGZO-TFT, which has good off-leak characteristics. However, these TFTs are not limiting, and the pixel circuits may be configured to operate in the same manner even when the channel type of the transistors that are to be used is switched between the P- and N-types, so long as such switching is made properly. For example, the embodiments may employ a configuration using N-type LTPS-TFTs in place of the P-type LTPS-TFTs.

Figure 19:
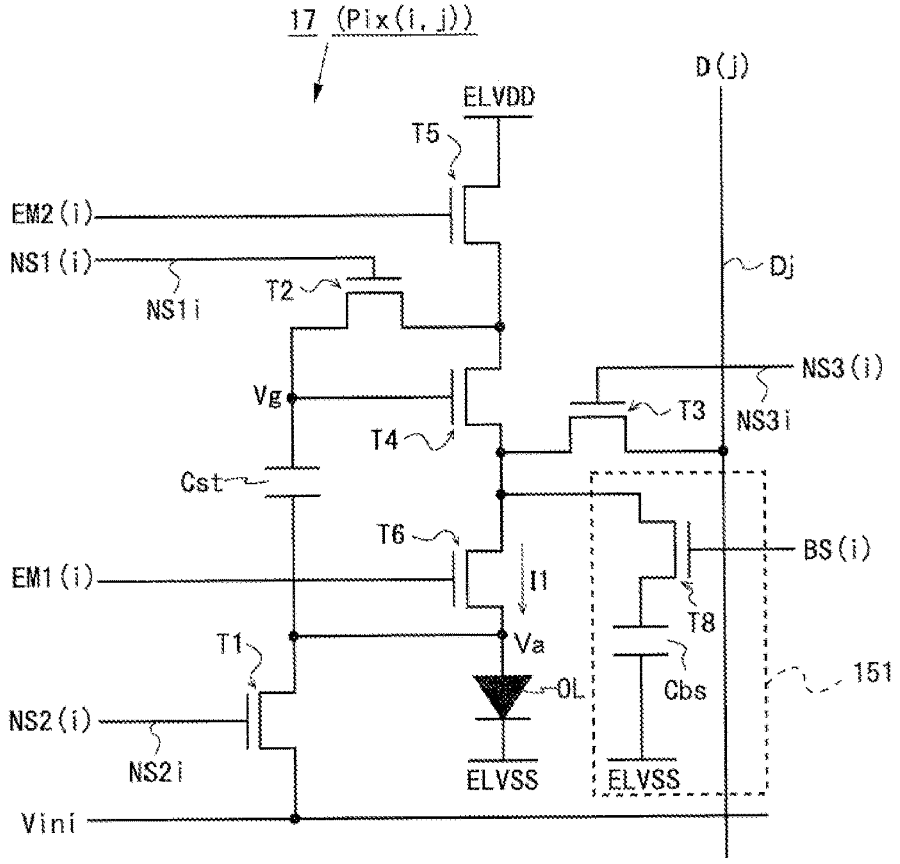
FIG. 19 is a circuit diagram illustrating the configuration of a pixel circuit in a display device according to a variant of the first embodiment.

FIG. 19 is a circuit diagram illustrating a configuration example where the disclosure is applied to a pixel circuit using an N-type LTPS-TFT as a drive transistor T4 (see Japanese Laid-Open Patent Publication No. 2019-211775). The pixel circuit 17 shown in FIG. 19 includes an organic EL element OL, which serves as a display element, an initialization transistor T1, a threshold compensation transistor T2, a data write control transistor T3, a drive transistor T4, a first emission control transistor T5, a second emission control transistor T6, and a data retention capacitor Cst, and these components TI to T6, Cst, and OL are connected as shown in FIG. 19. Moreover, the pixel circuit 17 is provided with a bias supply circuit 151, which includes a bias control transistor T8 and a bias retention capacitor Cbs connected in series with each other. The drive transistor T4 is connected at a source terminal to a low-level power supply line ELVSS through the bias control transistor T8 and the bias retention capacitor Cbs. In a display device according to the variant using such a pixel circuit 17 shown in FIG. 19, the display portion 11 is provided with first scanning signal lines NS11 to NS1*n*, second scanning signal lines NS21 to NS2*n*, and third scanning signal lines NS31 to NS3*n*, in place of the first scanning signal lines PS1 to PSn and the second scanning signal lines NS−1 to NSn in the first embodiment (see FIG. 1), the first scanning signal lines NS11 to NS1*n* transmit first scanning signals NS1(1) to NS1(*n*), respectively, the second scanning signal lines NS21 to NS2*n* transmit second scanning signals NS2(1) to NS2(*n*), respectively, and the third scanning signal lines NS31 to NS3*n* transmit third scanning signals NS3(1) to NS3(*n*), respectively. Moreover, in the display device according to this variant, the display portion 11 is provided with first emission control lines EM11 to EM1*n* and second emission control lines EM21 to EM2*n*, in place of the emission control lines EM1 to EMn in the first embodiment (see FIG. 1), the first emission control lines EM11 to EM1(*n*) transmit first emission control signals EM1(1) to EM1(*n*), respectively, and the second emission control lines EM21 to EM2*n* transmit second emission control signals EM2(G) to EM2(*n*), respectively. Other than the above, the variant is fundamentally identical in configuration to the first embodiment.

Figure 20:
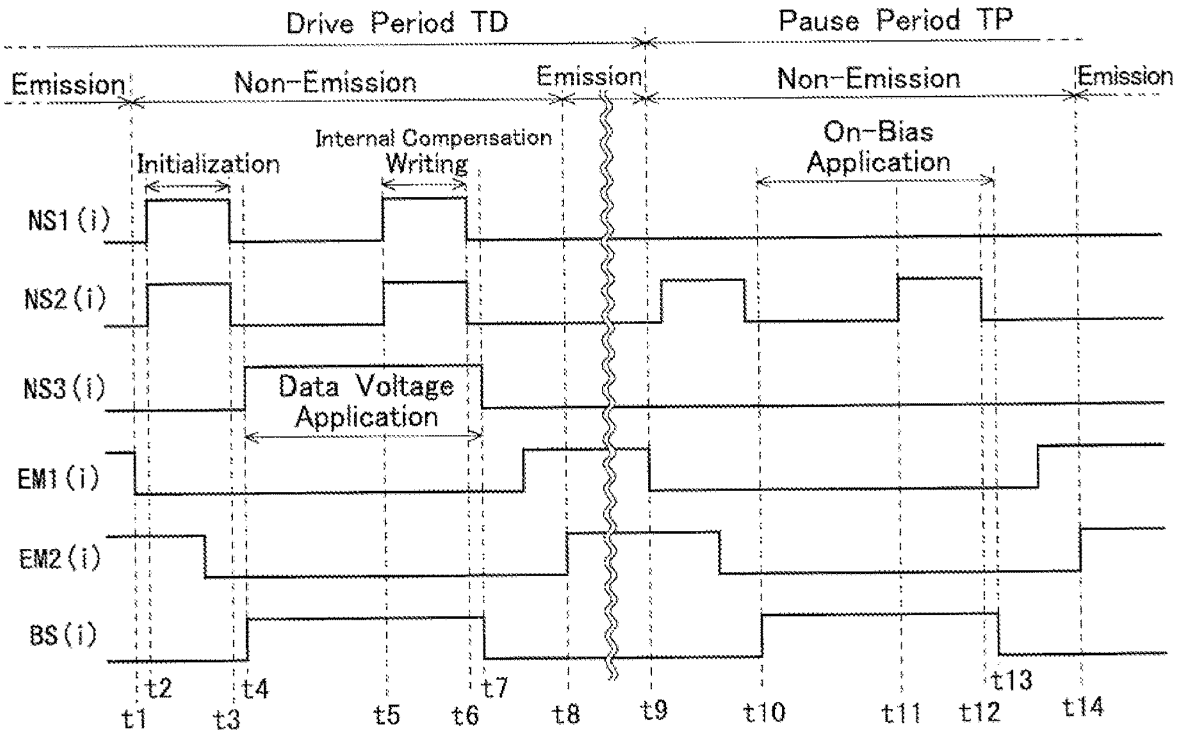
FIG. 20 is a timing chart for describing the operation of the pixel circuit shown in FIG. 19.

FIG. 20 is a timing chart for describing the operation of the pixel circuit 17 corresponding to the i'th first scanning signal line NS1*i* and the j'th data signal line Dj, i.e., the i'th-row, j'th-column pixel circuit Pix(i,j), in the variant configured as described above; more specifically, the timing chart is for describing the operation of the pixel circuit Pix(i,j) during the non-emission period, which is included in each frame period. In the variant, the pixel circuit Pix(i,j) is provided with a first scanning signal NS1(*i*), a second scanning signal. NS2(*i*), a third scanning signal NS3(*i*), a first emission control signal EM1(*i*), a second emission control signal EM2(*i*), and a bias control signal BS(i), which exhibit changes as shown in FIG. 20. Accordingly, in the non-emission period from t1 to t8 within the drive period TD (refresh frame period), the pixel circuit Pix(i,j) performs an initialization operation from t2 to t3, and writes a data voltage Vdata to the data retention capacitor Cst while performing internal compensation from t5 to t6. The bias control transistor 78 is in ON state from t4 to t7, and therefore the data voltage Vdata is also written to the bias retention capacitor Cbs through the bias control transistor T4 from t5 to t6. Moreover, during the non-emission period from t9 to t14 within each non-refresh frame period included in the pause period TP, the data voltage Vdata retained in the bias retention capacitor Cbs is applied as an on-bias voltage Vob to the source terminal of the drive transistor T4 from t10 to t13. By operating iii the above manner, the present variant renders it possible to achieve the same effects as those in the first embodiment.

In the pixel circuit 15 or 16 in the above embodiments, the data write control transistor T3 is of a P-type, and the threshold compensation transistor T2 and the first initialization transistor T1 are of an N-type, but the transistors T1 to T3[1] may be of the same conductivity type. For example, all of the transistors T1 to T3 may be of a P-type. In such a case, the display portion 11 may be provided with n+2 scanning signal lines that serve as both the first scanning signal lines PS1 to PSn and the second scanning signal lines NS−1 to NSn. In this manner, the number of scanning signal lines can be approximately halved compared to each of the above embodiments, and the configurations of the display portion 11 and the scanning-side drive circuit 40 can be simplified.

In the pixel circuit 15 (FIG. 7) in the first embodiment, the bias control transistor T8 controls the writing of the data voltage to the bias retention capacitor Cbs and also the application of the retained voltage (on-bias voltage Vob) of the bias retention capacitor Cbs to the drive transistor T4. However, these functions of the bias control transistor T8 may be implemented by two transistors. More specifically, the bias control transistor T8 may be replaced by a bias write control transistor configured to control the writing of the data voltage to the bias retention capacitor Cbs and a bias application control transistor configured to control the application of the retained voltage (on-bias voltage Vob) of the bias retention capacitor Cbs to the drive transistor T4. In such a case, the pixel circuit is configured such that, for example, the bias control transistor T8 functions as the bias application control transistor, with the connecting point of the bias control transistor T8 and the bias retention capacitor Cbs in the configuration shown in FIG. 7 being connected to the corresponding data signal line Dj through the bias write control transistor. In this configuration, the bias write control transistor and the bias application control transistor are provided at respective gate terminals with, for example, the first and second bias control signals BS1(*i*) and BS2(*i*) as shown in FIG. 16.

The pixel circuit 16 in the second embodiment (FIG. 15) is provided with the bias application control transistor T8 and the bias write control transistor T9 such that the connecting point of the bias application control transistor T8 and the bias retention capacitor Cbs1 is connected to the source terminal of the drive transistor T4 through the voltage dividing capacitor Cbs2 and the bias write control transistor T9. As an alternative to this, in the pixel circuit 16 also, the connecting point may be connected to the corresponding data signal line Dj through the voltage dividing capacitor Cbs2 and the bias write control transistor.

In the above embodiments, the pixel circuit 15 configured as shown in FIG. 7 or the pixel circuit 16 configured as shown in FIG. 15 is used, but as with the bias supply circuits 151 and 152, all other elements of the pixel circuit are not limited to the configurations shown in FIGS. 7 and 15. In the above embodiments, the pixel circuit (FIG. 7 or 15) is configured to perform threshold compensation with the drive transistor T4 being diode-connected, but the disclosure can also be applied to pixel circuits that do not perform such threshold compensation (pixel circuits without the threshold compensation function).

Figure 21:
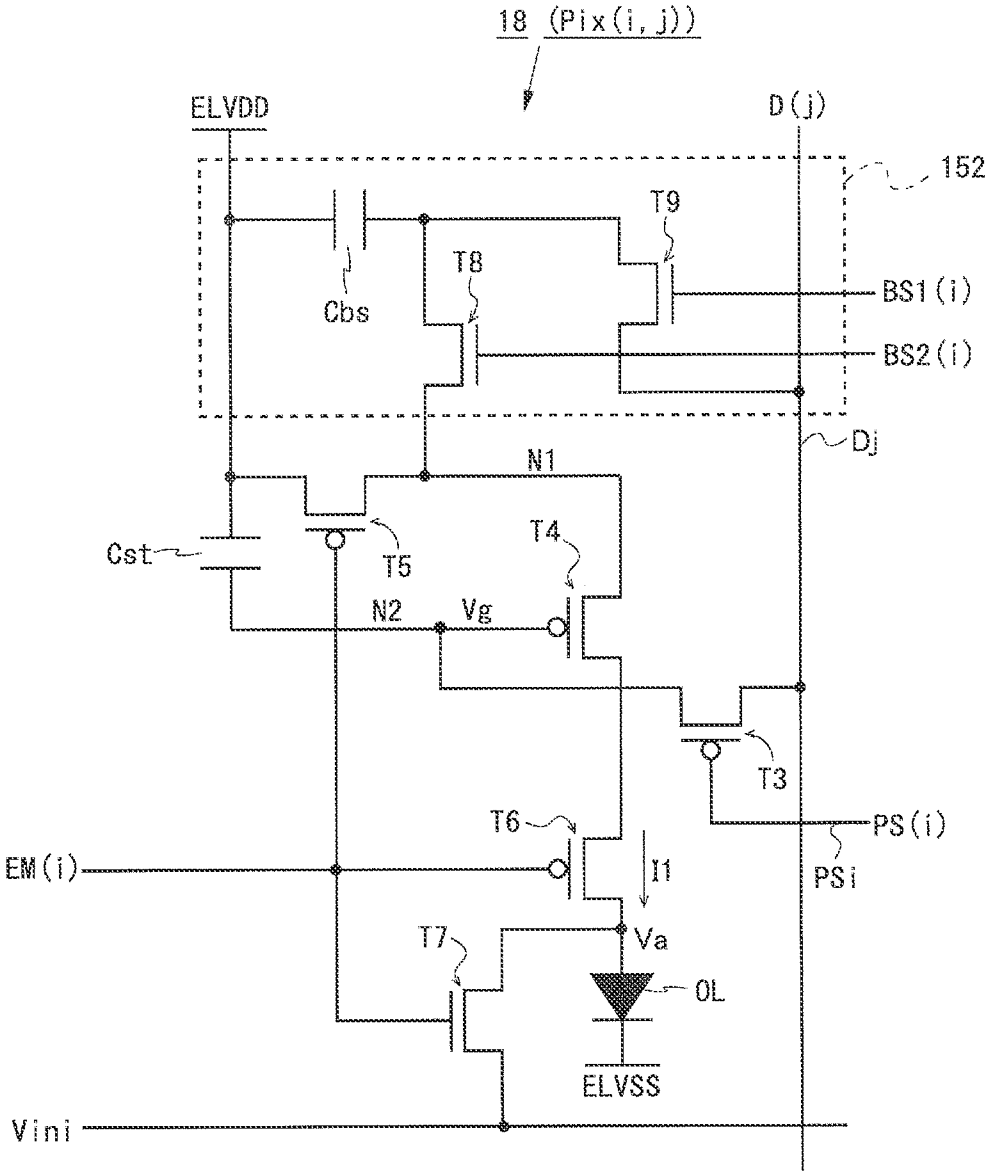
FIG. 21 is a circuit diagram illustrating a configuration example where a bias supply circuit is provided in a pixel circuit that does not perform threshold compensation using a diode connection.

FIG. 21 is a circuit diagram illustrating a configuration example where the disclosure is applied to a pixel circuit that does not perform threshold compensation with the drive transistor T4 being diode-connected; more specifically, the pixel circuit without the threshold compensation function is provided with a bias supply circuit. The pixel circuit 18 shown in FIG. 21 includes an organic EL element OL, which serves as a display element, a data write control transistor T3, a drive transistor T4, a first emission control transistor T5, a second emission control transistor T6, an initialization transistor T7, and a data retention capacitor Cst, and these components T3 to T7, Cst, and OL are connected as shown in FIG. 21. Moreover, the pixel circuit 18 is provided with a bias supply circuit 152, which includes a bias application control transistor T8 and a bias retention capacitor Cbs connected in series with each other, and also includes a bias write control transistor T9. The drive transistor T4 is connected at a source terminal to a high-level power supply line ELVDD through the bias application control transistor T8 and the bias retention capacitor Cbs. In addition, the data signal line Dj that corresponds to the pixel circuit 18 is connected to a connecting point of the bias application control transistor T8 and the bias retention capacitor Cbs through the bias write control transistor T9. In a display device according to a variant using such a pixel circuit 18 shown in FIG. 21, the display portion 11 is provided with first bias control lines BS11 to BS1*n* and second bias control lines BS21 to BS2*n*, in place of the bias control lines BS1 to BSn in the first embodiment (see FIG. 1), the first bias control lines BS11 to BS1*n* transmit first bias control signals BS1(1) to BS1 (*n*), respectively, and the second bias control lines BS21 to BS2*n* transmit second bias control signals BS2(1) to BS2(*n*), respectively. Other than the above, the variant is fundamentally identical in configuration to the first embodiment.

Figure 22:
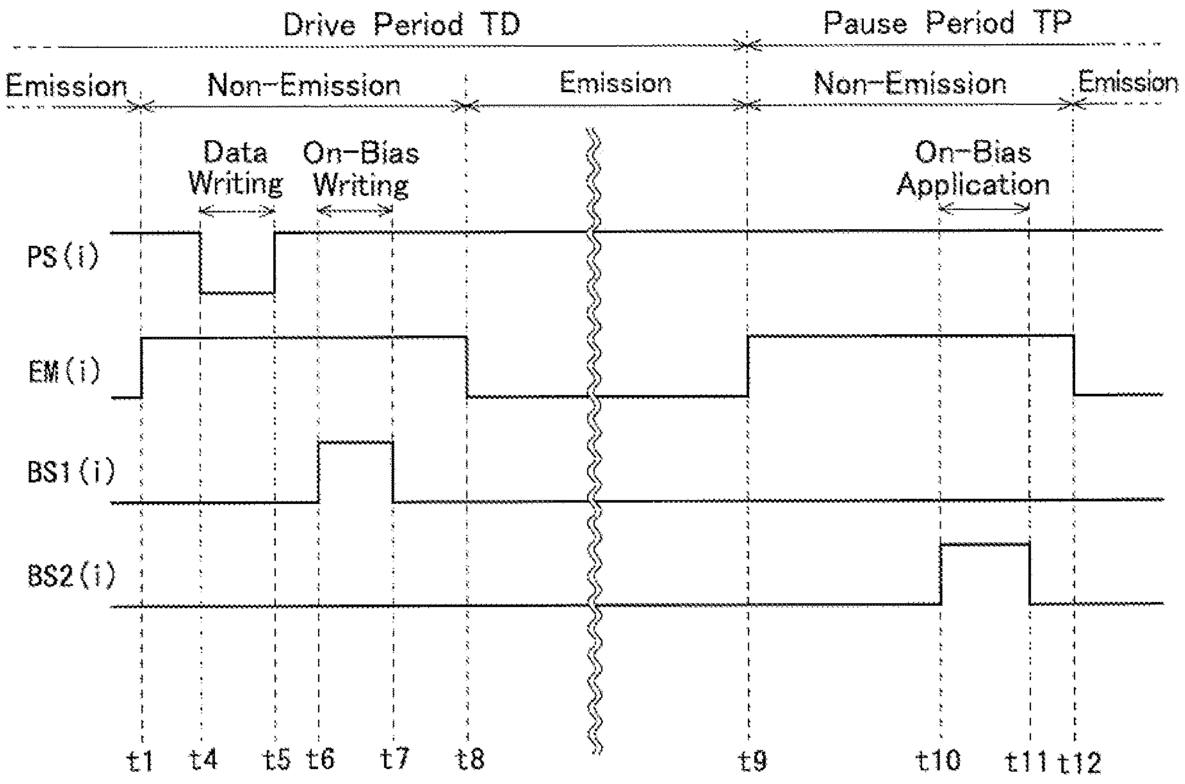
FIG. 22 is a timing chart for describing the operation of the pixel circuit shown in FIG. 21.

FIG. 22 is a timing chart for describing the operation of the thus configured pixel circuit 18 shown in FIG. 21 and corresponding to the i'th scanning signal line PSi and the j'th data signal line Dj, i.e., the i'th-row, j'th-column pixel circuit Pix(i,j); more specifically, the timing chart is for describing the operation of the pixel circuit Pix(i,j) during the non-emission period, which is included in each frame period. In this variant, the pixel circuit Pix(i,j) is provided with a first scanning signal. PS (i), an emission control signal EM (i), a first bias control signal BS1 (*i*), and a second bias control signal BS2 (*i*), which exhibit changes as shown in FIG. 22. Accordingly, in this pixel circuit Pix(i,j), in the non-emission period from t1 to t8 within the drive period TD (refresh frame period), a voltage of the corresponding data signal line Dj is written to the data retention capacitor Cst as a data voltage Vdata from t4 to t5, and also to the bias retention capacitor Cbs through the bias write control transistor T9 from t6 to t7. Here, the voltage of the corresponding data signal line Dj that is written to the bias retention capacitor Cbs corresponds to the data voltage Vdata written in the data retention capacitor Cst, but is not at the same level as the data voltage Vdata, and this voltage is set to eliminate or reduce the difference between the drive period TD and the pause period TP in terms of the voltage stress that is applied to the drive transistor T4 in the non-emission period. In a display device using the pixel circuit Pix(i,j) in the present configuration example, the data-side drive circuit 30 drives the data signal lines D1 to Dm such that the voltage as described above is provided to the bias retention capacitor Cbs in the pixel circuit Pix(i,j) through the corresponding data signal line Dj from t6 to t7. Moreover, in the non-emission period from t9 to t12 within each non-refresh frame period included in the pause period TP, the retained voltage of the bias retention capacitor Cbs (i.e., the voltage that corresponds to the data voltage Vdata) is applied as an on-bias voltage Vob to the source terminal of the drive transistor T4 through the bias application control transistor T8 from t10 to t11. By operating in this manner, the present variant enables pixel circuits that do not, perform threshold compensation with drive transistors being diode-connected (pixel circuits without the threshold compensation function) to achieve the same effects as those in the first embodiment.

In the above embodiments, within the drive period TD (or each RF frame period Trf), the period from t5 to t8, during which the corresponding bias control signal BS(i) or the corresponding first bias control signal BSi(i) is at H level, is shorter than the period from t4 to t9, during which the corresponding second scanning signal NS(i) is at H level, and longer than the data write period from t6 to t7 (see FIGS. 8 and 16), but the period from t5 to t8 may be set equal in duration to the period from t4 to t9 or the data write period from t6 to t7.

In the above embodiments, within the pause period TP (or each NRF frame period Tnrf), the on-bias application period from t12 to t13 is longer than the data write period from t6 to t7 (FIGS. 8 and 16), but may be set equal in duration to or shorter than the data write period from t: to t7.

It should be noted that the first and second embodiments and the variants thereof can be combined without departing from and technically contradicting the spirit of the disclosure.

While the embodiments have been described above taking as an example the organic EL display device, the disclosure is not limited to the organic EL display device and can be applied to any display devices, so long as the display devices perform pause drive using current-driven display elements. Examples of the display elements that can be used are organic EL elements, such as organic light-emitting diodes (OLEDs), inorganic light-emitting diodes, and quantum-dot light-emitting diodes (QLEDs).

DESCRIPTION OF THE REFERENCE CHARACTERS

10 organic EL display device
11 display portion
15, 16 pixel circuit
20 display control circuit
30 data-side drive circuit
(data signal line driver circuit)
40 scanning-side drive circuit
(scanning signal line driver circuit/emission control circuit/bias control circuit)
151, 152 bias supply circuit
Pix(i,j) pixel circuit (i=1 to n, i=1 to m)
PSi first scanning signal line (i=1, 2, . . . , n)
NSi second scanning signal line (i=−1, 0, 1, . . . , n)
EMi emission control line (i=1 to n)
BSi bias control line (i=1 to n)
BS1*i* first bias control line (i=1 to n)
BS2*i* second bias control line (i=1 to n)
Dj data signal line (j=1 to m)
ELVDD high-level power supply line
(first power supply line)
high-level power supply voltage
ELVSS low-level power supply line
(second power supply line)
low-level power supply voltage
OL organic EL element (display element)
Cst data retention capacitor
Cbs bias retention capacitor
Cbs1 bias retention capacitor
Cbs2 voltage dividing capacitor
T1 first initialization transistor
(first initialization switching element)
T2 threshold compensation transistor
(threshold compensation switching element)
T3 data write control transistor
(data write control switching element)
T4 drive transistor
T5 first emission control transistor
(first emission control switching element)
T6 second emission control transistor
(second emission control switching element)
T7 second initialization transistor
(second initialization switching element)
T8 bias control transistor
(bias control switching element)
bias application control transistor
(bias application control switching element)
T9 bias write control transistor
(bias write control switching element)
TD; drive period
TP pause period Trf refresh frame period (RF frame period)
Tnrf non-refresh frame period (NRF frame period)
Vob on-bias voltage

The invention claimed is:

1. A pixel circuit provided in a display device with a display portion including a plurality of data signal lines, a plurality of first scanning signal lines, a plurality of emission control lines, and first and second power supply lines, the pixel circuit corresponding to one of the data signal lines, one of the first scanning signal lines, and one of the emission control lines, comprising:
- a current-driven display element;
- a drive transistor having a control terminal, a first conductive terminal, and a second conductive terminal, and connected in series with the current-driven display element;
- a data retention capacitor;
- a data write control switching element having a control terminal connected to a corresponding one of the first scanning signal lines, and configured to control writing of a voltage of a corresponding one of the data signal lines to the data retention capacitor;
- a first emission control switching element having a control terminal connected to a corresponding one of the emission control lines; and
- a bias supply circuit, wherein
- the display portion further includes a plurality of bias control lines,
- the pixel circuit corresponds to one of the bias control lines,
- the bias supply circuit includes:
  - a bias retention capacitor configured to retain a voltage that corresponds to the voltage of the corresponding one of the data signal lines; and
  - a bias control switching element connected in series with the bias retention capacitor and having a control terminal connected to a corresponding one of the bias control lines,
- the control terminal of the drive transistor is connected to a constant voltage line through the data retention capacitor, and
- the first conductive terminal of the drive transistor is connected to the first power supply line through the first emission control switching element and to the constant voltage line through the bias control switching element and the bias retention capacitor.

2. The pixel circuit according to claim 1, wherein
- the display portion further includes a plurality of bias write control lines,
- the pixel circuit corresponds to one of the bias write control lines,
- the bias supply circuit further includes a bias write control switching element having a control terminal connected to a corresponding one of the bias write control lines, and
- the corresponding one of the data signal lines is connected to a connecting point of the bias control switching element and the bias retention capacitor through the bias write control switching element.

3. The pixel circuit according to claim 2, wherein
- the bias supply circuit further includes a voltage dividing capacitor connected in series with the bias write control switching element,
- the corresponding one of the data signal lines is connected to the connecting point of the bias control switching element and the bias retention capacitor through the bias write control switching element and the voltage dividing capacitor, and
- the first conductive terminal of the drive transistor is connected to a connecting point of the bias retention capacitor and the voltage dividing capacitor through the bias control switching element.

4. The pixel circuit according to claim 1, further comprising:
- a threshold compensation switching element; and
- a second emission control switching element, wherein
- the display portion further includes a plurality of second scanning signal lines,
- the pixel circuit corresponds to one of the second scanning signal lines,
- the threshold compensation switching element has a control terminal connected to a corresponding one of the second scanning signal lines,
- the first conductive terminal of the drive transistor is connected to the corresponding one of the data signal lines through the data write control switching element, and
- the second conductive terminal of the drive transistor is connected to the control terminal of the drive transistor through the threshold compensation switching element and to the second power supply line through the second emission control switching element.

5. The pixel circuit according to claim 4, wherein
- the drive transistor, the data write control switching element, and the first and second emission control switching elements are thin-film transistors channel layers of which are formed of low-temperature polysilicon, and
- the threshold compensation switching element and the bias control switching element are thin-film transistors channel layers of which are formed of an oxide semiconductor.

6. The pixel circuit according to claim 4, wherein
- the drive transistor is a P-type transistor,
- the first power supply line is a power supply line for supplying a high-level power supply voltage,
- the second power supply line is a power supply line for supplying a low-level power supply voltage, and
- the second conductive terminal of the drive transistor is connected to the second power supply line through the second emission control switching element and the current-driven display element.

7. The pixel circuit according to claim 4, wherein
- the drive transistor is an N-type transistor,
- the first power supply line is a power supply line for supplying a low-level power supply voltage,
- the second power supply line is a power supply line for supplying a high-level power supply voltage, and
- the first conductive terminal of the drive transistor is connected to the first power supply line through the first emission control switching element and the current-driven display element.

8. The pixel circuit according to claim 4, wherein
- the data write control switching element and the threshold compensation switching element are transistors of the same conductivity type, and
- the display portion includes a plurality of scanning signal lines serving as both the first scanning signal lines and the second scanning signal lines.

9. The pixel circuit according to claim 6, further comprising a first initialization switching element, wherein the display portion further includes an initialization voltage line, and the control terminal of the drive transistor is connected to the initialization voltage line through the first initialization switching element.

10. The pixel circuit according to claim 6, further comprising first and second initialization switching elements, wherein the display portion further includes an initialization voltage line, the control terminal of the drive transistor is connected to the initialization voltage line through the first initialization switching element, the second initialization switching element has a control terminal connected to the corresponding one of the emission control lines, and is in ON state when the corresponding one of the emission control lines is not active, and the current-driven display element has first and second terminals, with the first terminal connected to the second conductive terminal of the drive transistor through the second emission control switching element and to the initialization voltage line through the second initialization switching element, and the second terminal connected to the second power supply line.

11. The pixel circuit according to claim 9, wherein the drive transistor, the data write control switching element, and the first and second emission control switching elements are thin-film transistors channel layers of which are formed of low-temperature polysilicon, and the threshold compensation switching element, the bias control switching element, and the first initialization switching element are thin-film transistors channel layers of which are formed of an oxide semiconductor.

12. A display device comprising:

a display portion including a plurality of data signal lines, a plurality of first scanning signal lines, a plurality of emission control lines, a plurality of bias control lines, a first power supply line, a second power supply line, and a plurality of pixel circuits;

a data-side drive circuit configured to generate and apply a plurality of data signals to the data signal lines;

a scanning-side drive circuit configured to selectively drive the first scanning signal lines, selectively drive the emission control lines, and selectively drive the bias control lines; and a display control circuit configured to control the data-side drive circuit and the scanning-side drive circuit such that a drive period and a pause period alternate with each other, with the drive period including a refresh frame period for writing voltages of the data signals to the pixel circuits as data voltages, and the pause period including a non- refresh frame period for stopping the writing of the data voltages to the pixel circuits, wherein each of the pixel circuits corresponds to one of the data signal lines, one of the first scanning signal lines, one of the emission control lines, and one of the bias control lines, each of the pixel circuits includes:

a current-driven display element;

a drive transistor having a control terminal, a first conductive terminal, and a second conductive terminal, and connected in series with the current-driven display element;

a data retention capacitor;

a data write control switching element having a control terminal connected to a corresponding one of the first scanning signal lines, and configured to control writing of a voltage of a corresponding one of the data signal lines to the data retention capacitor;

a first emission control switching element having a control terminal connected to a corresponding one of the emission control lines; and a bias supply circuit, in each of the pixel circuits, the bias supply circuit includes a bias retention capacitor configured to retain a voltage that corresponds to the voltage of the corresponding one of the data signal lines, and a bias control switching element connected in series with the bias retention capacitor and having a control terminal connected to a corresponding one of the bias control lines, in each of the pixel circuits, the control terminal of the drive transistor is connected to a constant voltage line through the data retention capacitor, in each of the pixel circuits, the first conductive terminal of the drive transistor is connected to the first power supply line through the first emission control switching element and to the constant voltage line through the bias control switching element and the bias retention capacitor, the display control circuit controls the data-side drive circuit and the scanning- side drive circuit such that in the drive period, when the first emission control switching element is in an OFF state, the voltage of the corresponding one of the data signal lines is written and retained in the data retention capacitor as a data voltage, and a voltage that corresponds to the data voltage is written and retained in the bias retention capacitor, whereas when the first emission control switching element is in an ON state, a current that corresponds to the retained voltage of the data retention capacitor flows to the current-driven display element, and the display control circuit controls the scanning-side drive circuit such that in the pause period, when the first emission control switching element is in the OFF state, the retained voltage of the bias retention capacitor is applied to the first conductive terminal of the drive transistor, whereas when the first emission control switching element is in the ON state, the current that corresponds to the retained voltage of the data retention capacitor flows to the current-driven display element.

13. The display device according to claim 12, wherein the display portion further includes a plurality of bias write control lines, each of the pixel circuits corresponds to one of the bias write control lines, in each of the pixel circuits, the bias supply circuit further includes a bias write control switching element having a control terminal connected to a corresponding one of the bias write control lines, in each of the pixel circuits, the corresponding one of the data signal lines is connected to a connecting point of the bias control switching element and the bias retention capacitor through the bias write control switching element, and the display control circuit controls the data-side drive circuit and the scanning- side drive circuit such that in the drive period, when the first emission control switching element is in the OFF state, a voltage that corresponds to the data voltage to be written to the data retention capacitor is written and retained in the bias retention capacitor through the bias write control switching element, whereas in the pause period, when the first emission control switching element is in the OFF state, the retained voltage of the bias retention capacitor is applied to the first conductive terminal of the drive transistor through the bias control switching element.

14. The display device according to claim 13, wherein in each of the pixel circuits, the bias supply circuit further includes a voltage dividing capacitor connected in series with the bias write control switching element, in each of the pixel circuits, the corresponding one of the data signal lines is connected to the connecting point of the bias control switching element and the bias retention capacitor through the bias write control switching element and the voltage dividing capacitor, in each of the pixel circuits, the first conductive terminal of the drive transistor is connected to a connecting point of the bias retention capacitor and the voltage dividing capacitor through the bias control switching element, and the display control circuit controls the data-side drive circuit and the scanning- side drive circuit such that in the drive period, when the first emission control switching element is in the OFF state, the voltage that corresponds to the data voltage to be written to the data retention capacitor is written and retained in the bias retention capacitor through the bias write control switching element and the voltage dividing capacitor, whereas in the pause period, when the first emission control switching element is in the OFF state, the retained voltage of the bias retention capacitor is applied to the first conductive terminal of the drive transistor through the bias control switching element.

15. The display device according to claim 12, wherein the display portion further includes a plurality of second scanning signal lines, the scanning-side drive circuit selectively drives the second scanning signal lines, each of the pixel circuits corresponds to one of the second scanning signal lines, each of the pixel circuits further includes a threshold compensation switching element having a control terminal connected to a corresponding one of the second scanning signal lines, and a second emission control switching element having a control terminal connected to the corresponding one of the emission control lines, in each of the pixel circuits, the first conductive terminal of the drive transistor is connected to the corresponding one of the data signal lines through the data write control switching element, in each of the pixel circuits, the second conductive terminal of the drive transistor is connected to the control terminal of the drive transistor through the threshold compensation switching element and to the second power supply line through the second emission control switching element, and the display control circuit controls the data-side drive circuit and the scanning- side drive circuit such that in the drive period, when the first and second emission control switching elements are in the OFF state, the voltage of the corresponding one of the data signal lines is written and retained in the data retention capacitor as the data voltage through the data write control switching element, the drive transistor, and the threshold compensation switching element.

16. The display device according to claim 15, wherein the drive transistor, the data write control switching element, and the first and second emission control switching elements are thin-film transistors channel layers of which are formed of low-temperature polysilicon, and the threshold compensation switching element and the bias control switching element are thin-film transistors channel layers of which are formed of an oxide semiconductor.

17. A method for driving a display device with a display portion including a plurality of data signal lines, a plurality of first scanning signal lines, a plurality of emission control lines, first and second power supply lines, and a plurality of pixel circuits, wherein the display portion further includes a plurality of bias control lines, each of the pixel circuits corresponds to one of the data signal lines, one of the first scanning signal lines, one of the emission control lines, and one of the bias control lines, each of the pixel circuits includes:

a current-driven display element;

a drive transistor having a control terminal, a first conductive terminal, and a second conductive terminal, and connected in series with the current-driven display element;

a data retention capacitor;

a data write control switching element having a control terminal connected to a corresponding one of the first scanning signal lines, and configured to control writing of a voltage of a corresponding one of the data signal lines to the data retention capacitor;

a first emission control switching element having a control terminal connected to a corresponding one of the emission control lines; and a bias supply circuit, in each of the pixel circuits, the bias supply circuit includes a bias retention capacitor configured to retain a voltage that corresponds to the voltage of the corresponding one of the data signal lines, and a bias control switching element connected in series with the bias retention capacitor and having a control terminal connected to a corresponding one of the bias control lines, in each of the pixel circuits, the control terminal of the drive transistor is connected to a constant voltage line through the data retention capacitor, and in each of the pixel circuits, the first conductive terminal of the drive transistor is connected to the first power supply line through the first emission control switching element and to the constant voltage line through the bias control switching element and the bias retention capacitor, the method comprising:

a pause drive step of driving the data signal lines and the first scanning signal lines such that a drive period and a pause period alternate with each other, with the drive period including a refresh frame period for writing voltages of data signals to the pixel circuits as data voltages, and the pause period including a non-refresh frame period for stopping the writing of the data voltages to the pixel circuits, wherein the pause drive step includes:

a drive period step of applying the data signals to the data signal lines, selectively driving the first scanning signal lines and the bias control lines, and selectively deactivating the emission control lines, such that in the drive period, when the first emission control switching element is in an OFF state, the voltage of the corresponding one of the data signal lines is written and retained in the data retention capacitor as a data voltage, and a voltage that corresponds to the data voltage is written and retained in the bias retention capacitor, whereas when the first emission control switching element is in an ON state, a current that corresponds to the retained voltage of the data retention capacitor flows to the current-driven display element, and a pause period step of stopping the driving of the first scanning signal lines, selectively driving the bias control lines, and selectively deactivating the emission control lines, such that in the pause period, when the first emission control switching element is in the OFF state, the retained voltage of the bias retention capacitor is applied to the first conductive terminal of the drive transistor, whereas when the first emission control switching element is in the ON state, the current that corresponds to the retained voltage of the data retention capacitor flows to the current-driven display element.

18. The method according to claim 17, wherein the display portion further includes a plurality of bias write control lines, each of the pixel circuits corresponds to one of the bias write control lines, in each of the pixel circuits, the bias supply circuit further includes a bias write control switching element having a control terminal connected to a corresponding one of the bias write control lines, in each of the pixel circuits, the corresponding one of the data signal lines is connected to a connecting point of the bias control switching element and the bias retention capacitor through the bias write control switching element, in the drive period step, the data signals are applied to the data signal lines, the first scanning signal lines and the bias write control lines are selectively driven, and the emission control lines are selectively deactivated, such that in the drive period, when the first emission control switching element is in the OFF state, a voltage that corresponds to the data voltage to be written to the data retention capacitor is written and retained in the bias retention capacitor through the bias write control switching element, and in the pause period step, the driving of the first scanning signal lines is stopped, the bias control lines are selectively driven, and the emission control lines are selectively deactivated, such that in the pause period, when the first emission control switching element is in the OFF state, the retained voltage of the bias retention capacitor is applied to the first conductive terminal of the drive transistor through the bias control switching element.

19. The method according to claim 18, wherein in each of the pixel circuits, the bias supply circuit further includes a voltage dividing capacitor connected in series with the bias write control switching element, in each of the pixel circuits, the corresponding one of the data signal lines is connected to a connecting point of the bias control switching element and the bias retention capacitor through the bias write control switching element and the voltage dividing capacitor, in each of the pixel circuits, the first conductive terminal of the drive transistor is connected to a connecting point of the bias retention capacitor and the voltage dividing capacitor through the bias control switching element, and in the drive period step, the data signals are applied to the data signal lines, the driving of the bias control lines is stopped, the first scanning signal lines and the bias write control lines are selectively driven, and the emission control lines are selectively deactivated, such that in the drive period, when the first emission control switching element is in the OFF state, the voltage that corresponds to the data voltage to be written to the data retention capacitor is written and retained in the bias retention capacitor through the bias write control switching element and the voltage dividing capacitor, and in the pause period step, the driving of the first scanning signal lines and the bias write control lines is stopped, the bias control lines are selectively driven, and the emission control lines are selectively deactivated, such that in the pause period, when the first emission control switching element is in the OFF state, the retained voltage of the bias retention capacitor is applied to the first conductive terminal of the drive transistor through the bias control switching element.

20. The method according to claim 17, wherein the display portion further includes a plurality of second scanning signal lines, each of the pixel circuits corresponds to one of the second scanning signal lines, each of the pixel circuits further includes a threshold compensation switching element having a control terminal connected to a corresponding one of the second scanning signal lines, and a second emission control switching element having a control terminal connected to a corresponding one of the emission control lines, in each of the pixel circuits, the first conductive terminal of the drive transistor is connected to the corresponding one of the data signal lines through the data write control switching element, in each of the pixel circuits, the second conductive terminal of the drive transistor is connected to the control terminal of the drive transistor through the threshold compensation switching element and to the second power supply line through the second emission control switching element, and in the drive period step, the data signals are applied to the data signal lines, the first scanning signal lines are selectively driven, and the emission control lines are selectively deactivated, such that in the drive period, when the first and second emission control switching elements are in the OFF state, the voltage of the corresponding one of the data signal lines is written and retained in the data retention capacitor as the data voltage through the data write control switching element, the drive transistor, and the threshold compensation switching element.

* * * * *